US012333912B2

(12) United States Patent
Wexler et al.

(10) Patent No.: US 12,333,912 B2
(45) **Date of Patent: *Jun. 17, 2025**

(54) SPORTSBOOK ODDS OPTIMIZATION AND CORRELATED PROPOSITION BET ANALYSIS

(71) Applicant: SidePrize LLC, Atlanta, GA (US)

(72) Inventors: David Adam Wexler, Atlanta, GA (US); Jay Deuskar, Atlanta, GA (US); Dylan Cooper, Atlanta, GA (US)

(73) Assignee: SidePrize LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,757

(22) Filed: Apr. 30, 2024

(65) Prior Publication Data

US 2024/0290178 A1 Aug. 29, 2024

Related U.S. Application Data

(63) Continuation of application No. 18/193,482, filed on Mar. 30, 2023, now Pat. No. 12,002,332, which is a (Continued)

(51) Int. Cl.
*G07F 17/32* (2006.01)

(52) U.S. Cl.
CPC ...... *G07F 17/3288* (2013.01); *G07F 17/3272* (2013.01)

(58) Field of Classification Search
CPC ............. G07F 17/3288; G07F 17/3272; G07F 17/3244
See application file for complete search history.

(56) References Cited

U.S. PATENT DOCUMENTS

| | | | |
|---|---|---|---|
| 8,597,116 | B2 | 12/2013 | Nguyen et al. |
| 10,706,679 | B2 | 7/2020 | Cohen et al. |

(Continued)

FOREIGN PATENT DOCUMENTS

| | | | |
|---|---|---|---|
| WO | 0163439 | A1 | 8/2001 |
| WO | 2007124269 | A2 | 11/2007 |
| WO | 2013019789 | A1 | 2/2013 |

OTHER PUBLICATIONS

Co-Pending PCT Application No. PCT/US2019/39228, filed on Jun. 26, 2019, 86 Pages, entitled “Sportsbook Odds Optimization and Correlated Proposition Bet Analysis”

Davis J.L., et al., “Correlated Parlay Betting: an Analysis of Betting Market Profitability Scenarios in College Football,” The Journal of Prediction Markets, Dec. 2018, vol. 12(2), pp. 68-84.

Extended European Search Report for European Application No. 19935013.3, mailed Dec. 14, 2022, 8 Pages. .

(Continued)

*Primary Examiner* — Thomas H Henry

(74) *Attorney, Agent, or Firm* — Bradley Arant Boult Cummings LLP; Adam J. Thompson, Esq.

(57) ABSTRACT

A sportsbook odds optimization and parlay correlation analysis platform may be provided. The platform may be configured to assess the correlation value for proposition bet parlays. The platform may be employed by a sportsbooks or other betting event hosting establishment. The platform may be configured to establish parameters for processing at least one parlay offered to the establishment. The parameters may include, for example, but not be limited to, a correlation value and a payout type. Next, at least one parlay may be received for processing. A correlation value and a payout value associated with the at least one parlay may be calculated. The platform may be configured to determine whether to accept or decline the at least one parlay offering based on the parameters defined by the establishment. The at least one parlay may then be accepted or declined in accordance to the determination.

20 Claims, 6 Drawing Sheets

Related U.S. Application Data continuation of application No. 17/672,256, filed on Feb. 15, 2022, now Pat. No. 12,080,130, which is a continuation of application No. 16/877,358, filed on May 18, 2020, now Pat. No. 11,250,671, which is a continuation of application No. 16/645,282, filed as application No. PCT/US2019/039228 on Jun. 26, 2019, now Pat. No. 11,657,680.

(56) References Cited

U.S. PATENT DOCUMENTS

| | | | |
|---|---|---|---|
| 11,250,671 | B2 | 2/2022 | Wexler et al. |
| 2008/0076544 | A1 | 3/2008 | Mindes et al. |
| 2009/0215527 | A1 | 8/2009 | Lipscomb et al. |
| 2010/0184505 | A1 | 7/2010 | Bryson et al. |
| 2011/0118007 | A1 | 5/2011 | Gururajan et al. |
| 2013/0210516 | A1 | 8/2013 | Diehl |
| 2013/0217475 | A1 | 8/2013 | Guan |
| 2016/0086441 | A1 | 3/2016 | Cohen et al. |
| 2017/0011598 | A1 | 1/2017 | Strause et al. |
| 2017/0345256 | A1 | 11/2017 | Cohen et al. |
| 2018/0357857 | A1 | 12/2018 | Simon et al. |
| 2019/0362598 | A1 | 11/2019 | Marantelli |
| 2020/0242896 | A1 | 7/2020 | Higgins et al. |
| 2021/0358270 | A1 | 11/2021 | Wexler et al. |
| 2022/0005321 | A1 | 1/2022 | Wexler et al. |
| 2022/0172577 | A1 | 6/2022 | Wexler et al. |

OTHER PUBLICATIONS

Final Office Action for U.S. Appl. No. 16/877,358, mailed Mar. 16, 2021, 12 Pages.

International Preliminary Report on Patentability for International Application No. PCT/US2019/039228, mailed Jan. 6, 2022, 10 Pages.

International Search Report and Written Opinion for International Application No. PCT/US2019/039228, mailed Oct. 1, 2019, 11 Pages.

Moody A., “Finding Correlated Parlays in Betting,” liveabout.com, Updated Sep. 3, 2018, 3 Pages, Retrieved from URL: https://www.liveabout.com/finding-correlated-parlays-3116425.

Non-Final Office Action for U.S. Appl. No. 16/877,358, mailed Nov. 18, 2020, 14 Pages.

Non-Final Office Action for U.S. Appl. No. 17/672,256, mailed Sep. 21, 2023, 10 Pages.

Non-Final Office Action for U.S. Appl. No. 18/193,482, mailed Oct. 10, 2023, 9 Pages.

Notice of Allowance for U.S. Appl. No. 17/672,256 , mailed Jan. 18, 2024, 7 Pages.

Notice of Allowance for U.S. Appl. No. 18/193,482, mailed Jan. 30, 2024, 8 Pages.

Notice of Allowance for U.S. Appl. No. 18/193,482, mailed on Mar. 25, 2024, 2 Pages.

Notice of Allowance For U.S. Appl. No. 17/672,256, mailed on May 20, 2024, 2 Pages.

“Sportsbook Odds Optimization and Correlated Proposition Bet Analysis,” Applicant: SidePrize LLC, U.S. Appl. No. 16/877,358, filed May 18, 2020, 88 pages.

SPORTSBOOK ODDS OPTIMIZATION AND CORRELATED PROPOSITION BET ANALYSIS

RELATED APPLICATION

The present application is a continuation application of, and claims the benefit of and priority to, U.S. Ser. No. 18/193,482, filed Mar. 30, 2023, entitled "SPORTSBOOK ODDS OPTIMIZATION AND CORRELATED PROPOSITION BET ANALYSIS," which is a continuation application of U.S. Ser. No. 17/672,256, filed Feb. 15, 2022, entitled "SPORTSBOOK ODDS OPTIMIZATION AND CORRELATED PROPOSITION BET ANALYSIS," which is a continuation application of U.S. Ser. No. 16/877,358, filed May 18, 2020, entitled "SPORTSBOOK ODDS OPTIMIZATION AND CORRELATED PROPOSITION BET ANALYSIS," which is a continuation application of U.S. Ser. No. 16/645,282, filed Mar. 6, 2020, entitled "SPORTSBOOK ODDS OPTIMIZATION AND CORRELATED PROPOSITION BET ANALYSIS," which is a U.S. National Stage Application under 35 U.S.C. § 371 of International Application No. PCT/US19/39228, filed Jun. 26, 2019, entitled "SPORTSBOOK ODDS OPTIMIZATION AND CORRELATED PROPOSITION BET ANALYSIS," the contents of which are incorporated herein by reference in their entireties.

FIELD OF DISCLOSURE

The present disclosure generally relates to sportsbook administration and operation. More specifically, the present disclosure relates to calculating odds and correlations of bets and parlays.

BACKGROUND

Both fantasy sports and sports betting are mechanisms for increasing fan engagement, and have therefore became an emerging industry. More specifically, as sports betting, and even e-sports betting, becomes increasingly popular, a breadth of player prop bets are becoming more relevant for sportsbooks to include.

In light of the resource requirement to provide player prop parlays, the sports betting industry would rather stick to the wide variety of existing bets available, instead of offering complicated parlays with variable odds due to a plurality of correlations. Due to limitations such as, for example, insufficient technical infrastructure, human resources and software resources, many sportsbooks may not accept correlated player prop parlays at all (known as 'accumulators' in many parts of the world). Conventional sportsbook operators, or the "house," resolve the resource issue by providing a small bandwidth of pre-approved bets or by disabling parlayed bets altogether if any correlation is present. To further ensure favorable house odds, conventional strategy is to limit the availability of acceptable bets to a pre-approved listing of bets and pre-approved betting selections. As a result, the sportsbook, or "house," is also reducing its revenue potential.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A sportsbook odds optimization and parlay correlation analysis platform may be provided. The platform may be configured to assess the correlation value for proposition bet parlays offered to a sportsbooks or other betting event hosting establishment. The platform may be configured to establish parameters for processing at least one parlay offered to the establishment. The parameters may include, for example, but not be limited to, a correlation value and a payout type. Next, at least one parlay may be received for processing. A correlation value and a payout value associated with the at least one parlay may be calculated. The platform may be configured to determine whether to accept or decline the at least one parlay offering based on the parameters defined by the establishment. The at least one parlay may then be accepted or declined in accordance to the determination. If the at least one parlay is declined, the platform may be enabled to recommend an alternative payout model by which the at least one parlay may be placed in condition for acceptance by the establishment.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
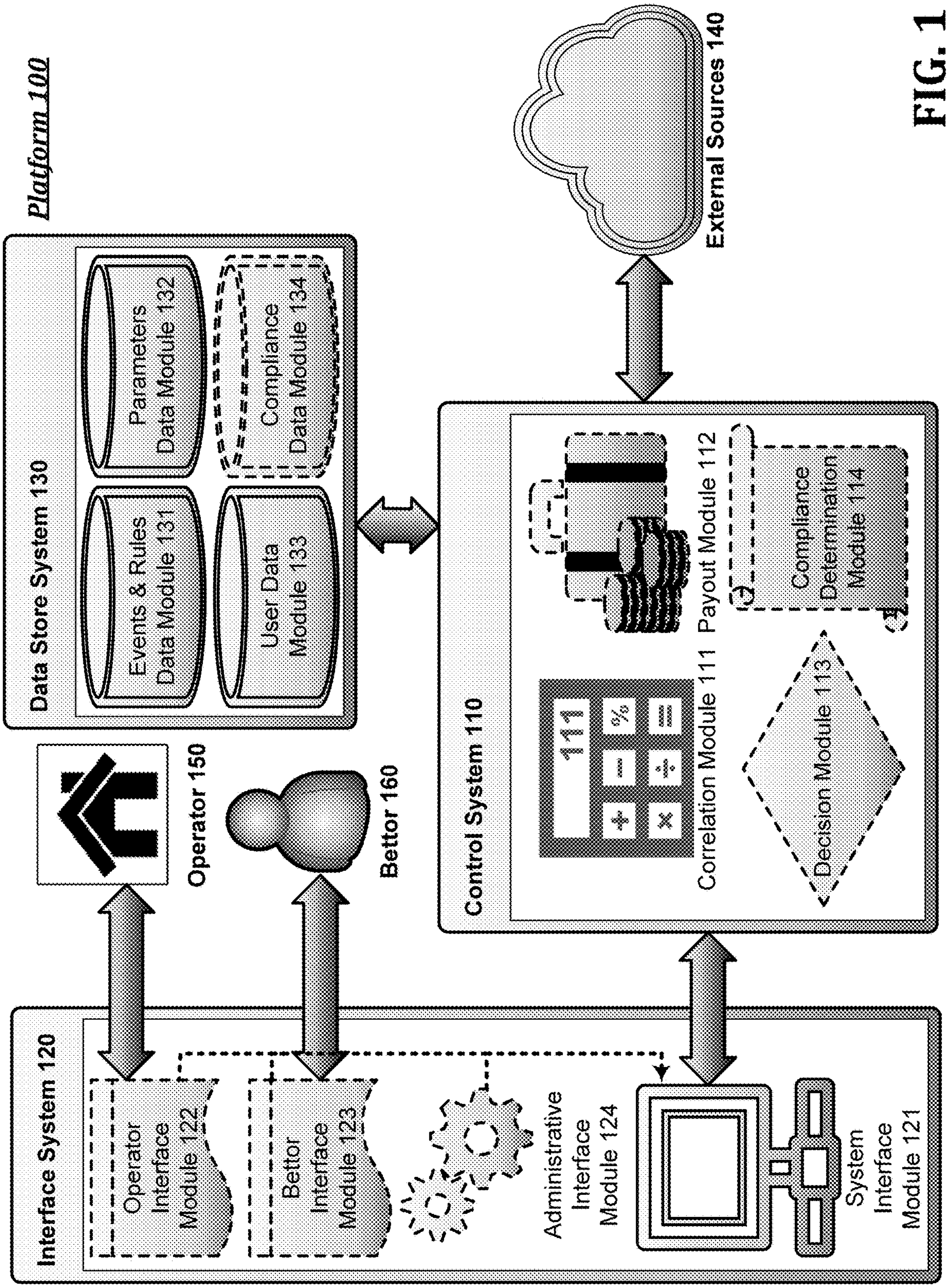
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purpose of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

I. Definitions

The following term listing and sample definitions are not meant to be construed as limiting upon the terms listed. Rather, the definitions are basic explanations that may be applicable in certain contexts, while other definitions may be used in other contexts, without deviating from the spirit and scope of the present disclosure.

Bettor—A platform user making at least one wager.

Operator—A platform user representing a game and/or sportsbook operator or a game organizer.

Wager—Something such as a sum of money risked on an uncertain event.

Bet—A single wager made by a bettor.

Parlay—A plurality of bets combined into one.

Proposition Bet—A type of bet where a wager on an individual player or specific event is made instead of a team or a plurality of events.

Sportsbook—A place where a bettor can place at least one wager on various sports.

Offer—A submission of a wager, bet, or parlay made to the Sportsbook.

Odds—A chance of a particular outcome for a future event.

Correlation—Interdependence between a plurality of factors. In other words, the probability of two or more events happening concurrently above what the probability of independent events happening concurrently would be.

Correlation Value—A measurement of correlation which may be a number between 1 and −1. A number close to 1 may mean two factors are positively correlated—they may rise or fall together and at a similar magnitude. A number close to −1 may mean the two factors move in opposing directions. A number closer to 0 means the two factors may be mostly random to each other, therefore not significantly correlated.

Related Contingencies—Any parlay bet within a correlation value that is not equal to zero. In other words, a related contingency may be any bet that has any sort of dependent event.

Payout—A amount of value, relative to the initial bet and/or parlay, that will be rewarded upon a win.

II. Platform Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

As sports betting proliferates and the market demands more player-based bets, the need for sportsbooks to allow as many player proposition ("player prop") bet combinations as possible is becoming a necessity to meet market demands and maintain commercial viability. However, sportsbooks do not dedicate enough resources to odds making and lines-making on player prop bets, and, as a result, sportsbook operators are not comfortable taking correlated parlayed player prop bets ("player prop parlays"). This is, in large part, due to the risk of inter-correlation of the correlated player prop bets, as well as what is called 'related contingencies' within the player prop bet itself. A related contingency may occur, for example, in an instance where two players' scores are not independent events.

The present disclosure provides a platform for a sportsbook (referred interchangeably as the "house") and a sportsbook operator (referred to interchangeably as the "operator") to ensure that the house and the operator have the means by which to accept player prop bets and player prop parlays, while mitigating the aforementioned risks of inter-correlation and related contingencies that would otherwise make the player prop bets and parlays too high risk or unfavorable to be accepted by the house. As one of ordinary skill in the field of the present disclosure would appreciate, the sportsbook, the house, the sportsbook operator, and the operator may, at times, be referred to collectively or individually by either term, depending on the context of the disclosure. Accordingly, the platform of the present disclosure may empower the house with the capability to accept those player prop bets and parlays that are sufficiently favorable with acceptable odds for the house, and, in turn, increase the scale of available bets that the house can methodically and systematically maintain. As a result, the platform may enhance the house's commercial viability through a statistical increase in revenue, as well as improve their ability to stand out from the competition.

The platform of the present disclosure may provide the aforementioned capabilities to the house by means of the methods and systems disclosed herein. The methods and systems may be integrated and deployed directly into a sportsbook's infrastructure. Further still, a platform consistent with embodiments of the present disclosure may provide a distributed operating environment through, for example, but not limited to an application programming interface (API) that connects to sportsbook infrastructure and enables the above-mentioned features, functions, and advantages for the sportsbook operator by way of a telecommunications network.

Accordingly, a platform consistent with embodiments of the present disclosure may provide a sportsbook and sportsbook operator with an ability to ensure that their games are enabled with, but not limited to: optimal odds for the house through the specification of correlation thresholds for each bet and parlay offered to the sportsbook by the bettor. That is, if a bet or parlay exceeds the specified correlation threshold calculated by the platform, the bet may be declined or rejected by the sportsbook, either by way of systematic operation or by operator selection. In this way, the sportsbook operator need not be required to pre-assess the risks of bets or parlays that have not been pre-approved or pre-calculated by the sportsbook. Rather, the platform of the present disclosure may enable the sportsbook operator to accept or decline bets based on a comparison of the platform's calculated correlation value to the threshold. By eliminating the conventional reliance upon a pre-calculated and pre-approved bets and parlays, the platform of the present disclosure may therefore enable open-ended selection of events qualified for entry with a higher bandwidth of bets and parlays that the sportsbook can accept. From the perspective of bettor, the platform may enable a sportsbook to allow the bettor to openly and freely construct their own bets and aggregate their custom parlays without any limitations upon the selections that the bettor may submit to the sportsbook.

Furthermore, conventional sportsbooks may employ a fixed odds model wherein, for example, 2-bet parlays may pay a 2.6× multiple, 3-bet parlays may pay a 6× multiple, and a 4-bet parlay may pay 11× multiple, and so on. In these conventional sportsbooks, bettors can take advantage of odds in their favor by studying correlation and stacking the most favorable bets together into a parlay, although many sportsbooks eliminate this risk by rejecting parlay submissions with any correlation. The platform of the present disclosure may mitigate this problem by allowing dynamic payouts (referred to interchangeably herein as "variable payouts") as it relates to the correlation of each bettor's player prop bet or parlay, limiting the payout based on the correlation value calculated for the parlay and/or for the bets within the parlay. With variable payouts, the platform may offer varying payouts dynamically depending on the level of correlation associated with the bets and/or parlay. Bets or parlays that are more highly correlated may have a lower payout multiple, while less correlated bets or parlays may have a higher payout multiplier. In this way, regardless of a sportsbook's bet or parlay correlation tolerance, the maximum liability exposure the operator is mitigated. It may therefore be possible, implementing a platform consistent with embodiments disclosed herein, to enable a bettor to submit a correlated parlay offer to a sportsbook comprised of, but not limited to, for example:

- a parlay bet from same event, team props;
- a parlay bet from same event, team and player props;
- a parlay bet from same event, but players on different teams, player props;
- a parlay bet from same event of players on the same team;
- a parlay bet for different events, player props;
- a parlay bet for different events, team props; and
- a parlay bet for different events, player and team props.

As will be described in more detail below, the aforementioned aspects of the present disclosure may be enabled by, for example, the sportsbook's implementation of the platform into the sportsbook infrastructure. The implementation of the platform by the sportsbook may enable the sportsbook operator to specify game types, applicable correlation rules, a correlation threshold, and a corresponding payout type for each player prop bet and parlay offered by a bettor to the sportsbook. With the implementation, the platform may receive bettor offerings to the sportsbook for processing and, in turn, enable the sportsbook to effectively accept or decline the bettor's offer based on the specifications provided by the sportsbook. In this way, the present disclosure may be used to, for example, optimize traditional sportsbooks, and for licensing to sports betting and fantasy game providers through, for example, API access.

Consistent with embodiments of the present disclosure, the platform may be comprised of methods, systems, and a computer readable medium having, but not limited to, at least one of the following modules:

A Decision Module;

A Correlation Module;

A Payout Module;
A System Interface Module;
A User Data Module
A Correlation and Rules Data Module
A Parameters Data Module In some embodiments, the present disclosure may provide an additional set of modules for further facilitating the software and hardware platform. The additional set of modules may comprise, but not be limited to:

A Bettor Interface Module;
An Operator Interface Module;
An Administrative Interface Module;
A Compliance Determination Module; and
A Compliance Data Module.

As illustrated in FIG. 1, the foregoing modules may be distributed within a platform 100 between Control System 110, an Interface System 120, and a Data Store System 130. Details with regards to each module are provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage disclosed within each module can be considered independently without the context of the other stages within the same module or different modules. Each stage may contain language defined in other portions of this specification. Each stage disclosed for one module may be mixed with the operational stages of another module. In the present disclosure, each stage can be claimed on its own and/or interchangeably with other stages of other modules.

The following depicts an example of a method of a plurality of methods that may be performed by at least one of the aforementioned modules. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, computing device 600 may be employed in the performance of some or all of the stages disclosed with regard to the methods.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned modules. The method may be embodied as, for example, but not limited to, computer instructions, which when executed, perform the method. The method may comprise the following stages:

1. Establishing parameters for processing one or more parlays;
    a. Specifying Accept/Decline Conditions:
        i. Operator-Based Specification
        ii. Bettor-Based Specification 2. Receiving one or more parlays for processing;
    a. Parsing Parlay Data
        i. Parlay/Bet Relationship
        ii. Bettor/Parlay Relationship
3. Calculating a correlation value associated with each parlay;
    a. Rules Based Correlation
        i. Correlation Rules
    b. Correlation of Bets within the Parlay
        i. Internal Correlation Factors
        ii. External Correlation Factors
    c. Recalculation of the Correlation Value as Bets are Received
    d. Accessing Correlation Rules Data Store System
        i. Determination of Which Correlation Rules to Use
    e. Accessing External Data Sources
        i. External Data Source Selection
            1. External Data Source Types
        ii. Identifying the Data Source based on a Correlation Rule Type
4. Calculating a payout value associated with one or more parlays;
    a. Type-Based Calculation
        i. Variable Payout Model
        ii. Fixed Payout Model
    b. Recalculation of the Correlation Value as Bets are Received
        i. Bettor-Based Specification
5. Determining whether to accept or decline the one or more parlays; and
    a. Verifying Accept/Decline Conditions
        i. Correlation Threshold Based Verification
        ii. Payout Type Based Verification
    b. Operator Based Determination
        i. Dashboard Display
        ii. Recommendation Display
    c. Limiting Available Bet Selections
        i. Pre-Calculating Each Combination
        ii. Limiting Choices based on Current Selection
6. Accepting or declining the parlay.
    a. Automated Acceptance of Parlay
        i. Based on Threshold Correlation Value
        ii. Based on Variable Payout Type
        iii. Based on Both Threshold Correlation Value and Variable Payout Type
    b. Operator Based Acceptance/Rejection
    c. Restriction of Additional Bet within the Parlay
        i. Additional Bet Acceptance/Rejection Based on Correlation Threshold
            1. Accepting
            2. Declining
        ii. Additional Bet Acceptance/Rejection Based on Payout Type
            1. Operating-Based Setting
            2. Bettor-Based Specification
                a. Accepting
                b. Declining The present disclosure includes many aspects and features. Moreover, while many aspects and features relate to, and are described in, the context of sportsbook administration, embodiments of the present disclosure are not limited to use only in this context, and may apply to other contexts, such as, but not limited to, for example, any proposition betting applications. Furthermore, aspects of the present disclosure may apply to any game against the house that satisfices legal regulation. For example, in the context of fantasy sportsbooks, an entry/contest may be legally required to include multiple players from the multiple teams. As a result of such requirement, all submissions may comprise multiple predications in one submission, and reminiscent of a parlay in sports betting.

Further still, the platform of the present disclosure may be employed with numerous bet types, known to those of ordinary skill in the field by as the following examples: Treble, Trixie, patent, Fourfould Accumulator, Yankee, Lucky 15, Fivefold Accumulator, Super Yankee, Lucky 13, a Sixfold Accumulator, a Heinz, Sevenfold Accumulator, Lucky 64, Super-Heinz, Eightfold Accumulator, a Goliath, Combination Forecast, Tricast, and Combination Tricast. The general premise of these bet types is to provide a higher chance of winning (at a reduced payout), because a reward is provided if some combination of parlays in the bet is correct. The more combinations that are correct, the higher the payout. Accordingly, embodiments of the present disclosure may be adapted with any combination bets, not just those of the referenced parlays. Rather, parlays are used as a common example of inputs into the platform.

For example, in a Trixie, three selections (e.g., three player propositions) may be made. Every possible combination of those three selections is made (i.e., three two pick parlays and one three-pick parlay). To receive a reward, at least two of these parlays have to hit, and the more hits, the higher the return. Accordingly, the platform of the present disclosure may enable the processing of player proposition parlays, with each payout value calculated appropriately based on the corrections within each parlay, and then calculated for the combination of the multiple parlays as a whole, based on, for example, but not limited to, the true odds of each of those parlays.

Both the foregoing overview and the following detailed description provide examples and are explanatory only. Accordingly, the foregoing overview and the following disclosure should not be considered to be restrictive. Further, features or variations may be provided in addition to those set forth herein. For example, embodiments may be directed to various feature combinations and sub-combinations described in the detailed description.

III. Platform Configuration

FIG. 1 illustrates one possible operating environment through which a platform consistent with embodiments of the present disclosure may be provided. The operating environment may be represented as systems and modules, with add-on modules represented with dashed lines. By way of non-limiting example, platform 100 may be hosted on, for example, a cloud computing service. In some embodiments, a sportsbook may access the cloud computing service through a licensing scheme. In some embodiments, platform 100 may be hosted on a server local to a sportsbook's computing infrastructure and remain mostly within a closed system. Users, such as an operator 150 or a bettor 160 may access platform 100 through, for example, interface system 120 provided a software application. The software application may be embodied as, for example, but not be limited to, a website, a web application, a desktop application, and a mobile application compatible with a computing device 600. One possible embodiment of the software application may be provided by the suite of products and services provided by SidePrize LLC. In other embodiments, interface system 120 may only communicate with control system 110 through an API, thereby integrating with any end-user interface that may be provided separately by a sportsbook.

Accordingly, embodiments of the present disclosure provide a software and hardware platform comprised of a distributed set of computing elements, including, but not limited to:

a. Control System 110
i. Correlation Module 111
ii. Payout Module 112
iii. Decision Module 113
iv. Compliance Module 114
b. Interface System 120
i. System Interface Module 121
ii. Operator Interface Module 122
iii. Bettor Interface Module 123
iv. Administrative Interface Module 124
c. Data Store 130
i. Events and rules Data Module 131
ii. Parameters Data Module 132
iii. User Data Module 133
iv. Compliance Data Module 134
d. External Sources 140

A. Control System 110

Consistent with embodiments consistent with the present disclosure, upon implementation with a sportsbook infrastructure, control system 110 may be configured to monitor the actions of a sports betting game and define the operations of the game, or otherwise control the functions of the game in accordance to the specifications set forth by the sportsbook operator. Control system 110 may be a centralized entity or a distributed platform. In some embodiments, control system 110 may be configured to operate a plurality of games for a plurality of sportsbooks by a plurality of operators with access to the control system 110. That is, control system 110 may affect certain actions, functions, features, results, and representations made available to bettor 160 and operator 150 in a number of different operating environments. As will be detailed below, bettors 160 and operators 150 may interface with the control system 110, either directly or indirectly, via interface system 120. Interface system 120 is further detailed in the corresponding sub-heading below.

Control system 110 may employ a correlation module 111 to calculate the correlation value associated with bets and parlays received through interface system 120. Correlation module 111 may access a plurality of correlation rules and calculation formulas from, for example, data store system 130's events and rules data module 131. Correlation module 111 is further detailed in the corresponding sub-heading below.

Control system 110 may employ a payout module 112 to calculate a payout associated with a bet or parlay based on, for example, a specified payout type for the game. Payout module 112 may ascertain the payout type either based on, but not limited to, for example, an operator 150's or bettor 160's payout type specification, which may be stored in, for example, data store system 130. Payout module 112 is further detailed in the corresponding sub-heading below.

Control system 110 may employ a decision module 113 to determine, for example, whether or not the implementing sportsbook should accept a bet or parlay. The determination may be made based on various game parameters, settings, user data, game rules, and other aspects detailed below. Furthermore, in some embodiments, control system 110 may access external sources to assist in its determination. Decision module 113 is further detailed in the corresponding sub-heading below.

In some embodiments, control system 110 may employ a compliance module 114 to determine whether a given parlay may be in legal compliance with the rules and regulations in effect within a particular jurisdiction. Accordingly, compliance module 114 may be employed to ensure that offers received by the sportsbook are in compliance with the relevant rules and regulations of a jurisdiction associated with bettor 160 and/or the sportsbook.

i. Correlation Module 111

In some embodiments consistent with the present disclosure, correlation module 111 may be provided to calculate different possible correlations for a bet and/or parlay(s). The correlations may exist between, for example, but not limited to, bets in a parlay, between bet(s) and/or parlay(s) amongst different bettors 160 on the platform, with external factors affecting a bet and/or parlay(s). The external factors may include, for example, but not limited to, time of day, climate considerations, fatigue, injuries, and various other parameters that may be ascertained from external sources 140. It is contemplated that other correlation types may exist, and that correlation module 111 may be configured to account for such other correlation types.

In some embodiments consistent with the present disclosure, correlation module 111 may be enabled to calculated based on modified rules of the game for new players joining the game. That is, while the past bet(s) and/or parlay(s) may not be changed, in some embodiments, platform 100 may enable operator 150 to alter new bet(s) and/or parlay(s) parameters. For example, the number of variables in a bet or the number of bets required with a parlay may be changed. As another example, a correlation threshold representing the sportsbook's risk tolerance, may be decreased and/or increased.

In some embodiments consistent with the present disclosure, correlation module 111 may return a correlation value reflecting an amount of correlation, or related contingency, based on the inputs. In some embodiments, correlation module 111 may determine that a given parlay is so correlated that it's "unpriceable" (not feasible for the Bettor and/or operator), and instead may determine that enforcement of additional validation in the bettor's selections is necessary, in order to create a bet that could be priced at either fixed and/or variable odds. This may be relevant and applicable in certain industries, such as e-sports, or other "ultra-correlated" sports. In ultra-correlated sports, there may be multiple layers of correlation more in games like these in the esports realm, that it requires rules and validations such as requiring multiple players from multiple games, or forcing at least one over and one under in the parlay. Therefore, in some embodiments, for e-sports (or other ultra-correlated events), platform 100 might determine that a given parlay is so correlated that it's "unpriceable" (i.e., not feasible for the Bettor or operator) and would, therefore, enforce other validations in bettor 160's selections in order to create a bet and/or parlay that can be priced at either a fixed payout model or a variable payout model.

Consistent with embodiments of the present disclosure, correlation may be defined as the likeliness of two events happening concurrently above what 2 independent events would be. For an uncorrelated 2-pick parlay, the true odds of winning may be 3:1 (the house has a 75% chance, the bettor has a 25% chance). Each pick in the parlay may have a 50% of hitting. 1/(0.5*0.5) gives you a 25% chance at winning. If the parlay is correlated and, for example, you had a Quarterback and Wide Receiver from the same team as bets within the parlay, a correlation value of 0.25 may be assigned. Now the math for the true odds (or chance) of winning that bet becomes 1/(0.5*(0.5+0.25)) or a 375 chance at winning. Because the positive correlation increased the odds of winning, it proportionally should decrease the payout in a variable payout model. Correlation to the weather is factored in to the overall correlation where it is relevant, such as for outdoor sports, whether its nominal or large. In the prior example, based on the weather, the '0.25' correlation can be higher or lower.

By way of non-limiting examples, the correlations may include, but not limited to, the following:

1. Sport Based Correlation and Position Based Correlation
   - Example: Baseball Hitters-When hitters in the same lineup do well it leads to more opportunities for Runs/RBIs as well as more at bats leading to more chances for hits/walks/home runs.
   - Example: Baseball Hitter v Pitcher Negative-If hitter goes Over (Under) more likely opposing pitcher goes Under (Over).
   - Example: Soccer/Hockey Same Team-All goals may be correlated as teams get points and assists.
   - Example: Soccer/Hockey Goalie v Opposing Team—When teams score it may negatively impact the goalie's scores and vice versa.
   - Example: Football Correlations—The quarterback and wide receiver may be correlated, as well as many other positions on the team, opposing teams, and so on.
   - Example: NBA Guard/Forward Correlation-Assists from the point guard to points for Big Men (e.g., forwards and centers) are highly correlated.
2. Game Script Correlation
   - Games may go a variety of different directions depending on play. These cause players to often go in unison in the same or opposite direction. Example: If game becomes shootout/grind (e.g., high scoring or low scoring game.) it out game, all players in single event will be correlated together.
   - Example: If the football game turns into a high scoring contest with a ton of offense and little defense, all of the players will be inclined to go over their original projections, thus a correlation on overs.
3. Environment correlation The weather may be factored into the overall correlation. It may be present for every outdoor sport, whether its nominal or large.
   - Example: Golf-Weather/Pin Position could affect scores for all golfers for that day.
   - Example: Baseball-Weather including rain, temperature, altitude can correlate all scores in a single event.
   - Example: Football-Weather including precipitation and temperature can correlate scores for a single event.
4. Blowout correlation In a blowout, all players may be rested causing UNDER correlation.
5. Overtime correlation In game overtime, players may play more minutes/innings than projected causing OVER correlation.

The following is a non-exhaustive, illustrative list of other correlation parameters that may be considered.

| Correlation Parameters | Sport | Correlation Parameters | Sport |
|---|---|---|---|
| Golfer/Golfer Same Course | Golf | QB/Opp WR3 | Football |
| QB/WR1 | Football | NBA Same Game OT | Basketball |

-continued

| Correlation Parameters | Sport | Correlation Parameters | Sport |
|---|---|---|---|
| Center/WingA | Hockey | Hitter1/Hitter8 | Baseball |
| QB/WR2 | Football | Hitter1/Hitter9 | Baseball |
| QB/TE | Football | Hitter3/Hitter9 | Baseball |
| Center/WingB | Hockey | Hitter7/Hitter9 | Baseball |
| Center/Defender | Hockey | WingB/Defender | Hockey |
| Forward/Forward | Soccer | NBA Blowout | Basketball |
| QB/WR3 | Football | Opp Pitcher v Hitter 2 | Baseball |
| QB/Opp Shootout QB | Football | Opp Pitcher v Hitter 5 | Baseball |
| Defender/Defender | Soccer | Opp Pitcher v Hitter 6 | Baseball |
| Hitter1/Hitter2 | Baseball | Hitter1/Hitter7 | Baseball |
| Center v Opp Goalie | Hockey | Hitter5/Hitter7 | Baseball |
| Pass First PG/C | Basketball | NHL Overtime | Hockey |
| Goalie/Defender | Soccer | PG/PF | Basketball |
| Hitter5/Hitter6 | Baseball | Pass First PG/SF | Basketball |
| WingA/WingB | Hockey | Opp Pitcher v Hitter 7 | Baseball |
| Hitter3/Hitter6 | Baseball | Hitter2/Hitter8 | Baseball |
| QB/Opp Average QB | Football | Hitter3/Hitter7 | Baseball |
| Pass First PG/PF | Basketball | WR3/Opp WR3 | Football |
| Hitter3/Hitter5 | Baseball | SG/C | Basketball |
| WingA v Opp Goalie | Hockey | Scoring PG/PF | Basketball |
| Forward v Opp Goalie | Soccer | Forward/Mid | Soccer |
| Wing B v Opp Goalie | Hockey | Soccer OT | Soccer |
| Opp Pitcher v Hitter 3 | Baseball | Opp Pitcher v Hitter 8 | Baseball |
| PG/C | Basketball | Hitter1/Hitter3 | Baseball |
| Opp Pitcher v Hitter 4 | Baseball | Hitter4/Hitter5 | Baseball |
| QB/Opp Non-Shootout QB | Football | Hitter6/Hitter9 | Baseball |
| Hitter6/Hitter8 | Baseball | WingA/Defender | Hockey |
| Hitter7/Hitter8 | Baseball | QB/Opp TE | Football |
| Midfield v Opp Goalie | Soccer | QB/Opp WR1 | Football |
| Hitter2/Hitter9 | Baseball | Hitter1/Hitter4 | Baseball |
| QB/Opp WR3 | Football | Hitter3/Hitter8 | Baseball |
| NBA Same Game OT | Basketball | Scoring PG/C | Basketball |
| Hitter1/Hitter8 | Baseball | Opp Pitcher v Hitter 1 | Baseball |
| Hitter1/Hitter9 | Baseball | Hitter3/Hitter4 | Baseball |
| Hitter3/Hitter9 | Baseball | Hitter6/Hitter7 | Baseball |
| Hitter7/Hitter9 | Baseball | NFL Shootout | Football |
| WingB/Defender | Hockey | Defender/Defender | Hockey |
| NBA Blowout | Basketball | Defender v Opp Goalie | Hockey |
| Opp Pitcher v Hitter 2 | Baseball | QB/RB1 | Football |
| Opp Pitcher v Hitter 5 | Baseball | SG/PF | Basketball |
| Opp Pitcher v Hitter 6 | Baseball | Scoring PG/SG | Basketball |
| Hitter1/Hitter7 | Baseball | Opp Pitcher v Hitter 9 | Baseball |
| Hitter5/Hitter7 | Baseball | Hitter1/Hitter5 | Baseball |
| NHL Overtime | Hockey | Hitter2/Hitter3 | Baseball |
| PG/PF | Basketball | Hitter4/Hitter6 | Baseball |
| Pass First PG/SF | Basketball | Hitter5/Hitter8 | Baseball |
| Opp Pitcher v Hitter 7 | Baseball | Hitter8/Hitter9 | Baseball |
| Hitter2/Hitter8 | Baseball | QB/Opp WR2 | Football |
| Hitter3/Hitter7 | Baseball | Hitter2/Hitter4 | Baseball |
| WR3/Opp WR3 | Football | Hitter3/Hitter8 | Baseball |
| SG/C | Basketball | Defender/Defender | Hockey |
| Scoring PG/PF | Basketball | Defender v Opp Goalie | Hockey |
| Forward/Mid | Soccer | QB/RB1 | Football |
| Soccer OT | Soccer | SG/PF | Basketball |
| Opp Pitcher v Hitter 8 | Baseball | Scoring PG/SG | Basketball |
| Hitter1/Hitter3 | Baseball | Opp Pitcher v Hitter 9 | Baseball |
| Hitter4/Hitter5 | Baseball | Hitter1/Hitter5 | Baseball |
| Hitter6/Hitter9 | Baseball | Hitter2/Hitter3 | Baseball |
| WingA/Defender | Hockey | Hitter4/Hitter6 | Baseball |
| QB/Opp TE | Football | Hitter5/Hitter8 | Baseball |
| QB/Opp WR1 | Football | Hitter1/Hitter4 | Baseball |
| Hitter8/Hitter9 | Baseball | TE/Opp TE | Football |
| QB/Opp WR2 | Football | TE/Opp WR2 | Football |
| Hitter2/Hitter4 | Baseball | WR1/Opp WR2 | Football |
| Hitter4/Hitter7 | Baseball | PG/SG | Basketball |
| WR1/Opp WR1 | Football | SF/PF | Basketball |
| WR1/Opp WR3 | Football | Goalie/Forward | Soccer |
| TE/WR2 | Football | RB/Opp RB1 | Football |
| PF/C | Basketball | RB/Opp WR2 | Football |
| Hitter2/Hitter5 | Baseball | WR2/Opp WR2 | Football |
| Hitter4/Hitter8 | Baseball | RB/WR2 | Football |
| Hitter5/Hitter9 | Baseball | WR1/WR3 | Football |
| TE/WR3 | Football | WR2/WR3 | Football |

-continued

| Correlation Parameters | Sport | Correlation Parameters | Sport |
|---|---|---|---|
| SG/SF | Basketball | SF/C | Basketball |
| Hitter2/Hitter6 | Baseball | Scoring PG/SF | Basketball |
| TE/Opp WR1 | Football | RB/Opp WR1 | Football |
| WR2/Opp WR3 | Football | RB/WR1 | Football |
| TE/WR1 | Football | RB/Opp WR3 | Football |
| WR1/WR2 | Football | TE/Opp WR3 | Football |
| Pass First PG/SG | Basketball | RB/WR3 | Football |
| Goalie/Midfield | Soccer | RB/TE | Football |
| Defender v Opp Goalie | Soccer | PG/SF | Basketball |
| Hitter1/Hitter6 | Baseball | Hitter2/Hitter7 | Baseball |
| Hitter4/Hitter9 | Baseball | RB/Opp TE | Football |
| QB/Opp RB1 | Football | | |

ii. Payout Module 112

In various embodiments consistent with the present disclosure, payout module 112 may be provided for calculation of payouts. The calculation of payouts may be determined based on a plurality of criteria, such as, but not limited to:

A Bettor places a bet on a single player;

A Bettor selects two or more players in a prop bet and/or a parlay;

Correlation Threshold or Risk tolerance of the Operator and/or Bettor;

Correlation Value;

Confidence Level; and

Other Related Contingencies.

In some embodiments consistent with the present disclosure, the Operator and/or Bettor may choose fixed payout odds. Fixed payout odds may be where the payout may be predetermined to a fixed number, such as, but not limited to 2.5×, 5×, 10×, etc.

Moreover, in some embodiments consistent with the present disclosure, a payout may be calculated dynamically based on, for example, but not limited to, a correlation coefficient provided by the Correlation Module. In some embodiments, operator 150 may provide a risk tolerance parameter and/or minimum rake (margin) which may affect the calculation of a payout that is calculated dynamically. In some embodiments, a variable payout may be adjusted based on factors external to related contingencies, such as bet(s) and/or parlay(s) that have been placed previously on the same event. For example, if every bettor 160 places a bet on the same team, each consecutive bet placed on that team may have a lower payout.

As will be detailed below, decision module 113 may enable bettor 160 to switch to a payout type to variable in response to a correlation value exceeding for a fixed payout type. Accordingly, in some embodiments, operator 150 may provide a correlation threshold with a fixed payout type and allow a bettor 160 to exceed the correlation threshold upon a switching to a variable payout type. In some embodiments, a hybrid of correlation threshold selection and variable payout type may enable both parameters to co-exist in the same game.

By way of non-limiting example, a parlay of multiple bets may cause the payout value to increase. If the parlay is comprised of low odds bets, a higher payout value may be provided. However, if those low odds bets are correlated in a parlay, that payout value may decrease a certain amount based on how correlated the two bets are.

iii. Decision Module 113

In various embodiments consistent with the present disclosure, decision module 113 may be used as a control interface for regulating the available functions to Bettors 160 in various game formats. For example, decision module 113 may be employed by the sportsbook to systematically accept or decline bets and/or parlays offered for acceptance to a sportsbook operator. In such embodiments, control system 110 may be operative to control various aspects of a game through interface system 120.

Still consistent with the embodiments of the present disclosure, decision module 113 may be used to communication a correlation value (as calculated by correlation module 111) or a payout value (as calculated by payout module 112), such that the sportsbook operator 150 can make their own determination as to whether the offer from bettor 160 should be accepted. In such embodiments, decision module 113 presents operator 150 with a dashboard via interface system 120, without requiring the operative control of the game.

Further still, in various embodiments, decision module 113 may make a recommendation of whether to accept or decline the bet and/or parlay(s) to operator 150. For example, decision module 113 may be configured to provide an indication as to whether an offer presented to the sportsbook is within the parameters specified for the corresponding game.

In yet other embodiments, decision module 113 may impact a front-end control provided by the interface system 120. In such embodiments, decision module 113 may limit or decline the selections made by bettor 160 as they are received.

In order for decision module 113 to render a decision and impact an action upon platform 100, the specifications for one or more games must be provided. Such specifications may define the game rules, as well as other parameters of the game. In an instance, the specification may define the conditions upon which an offer made by bettor 160 within the game may be analyzed for the determination of acceptance by the sportsbook.

In some embodiments consistent with the present disclosure, a user of the platform, such as operator 150, may specify conditions and/or parameters for accepting and/or declining bet(s) and/or parlay(s). These conditions and/or parameters may be incorporated into a calculation for acceptance or denial of bet(s) and/or parlays.

1. Operator Based Specification

In some embodiments, platform 100 may enable operator 150 to define their risk tolerance, control available bets to the customer, and modify their criteria as it relates to their maximum liability, in order to, for example, but not limited to, increase the favorable odds for the sportsbook. This may be achieved by a specification of a correlation threshold, which may serve as the basis against which a correlation value of a bet or parlay is analyzed. The higher the correlation threshold, the larger tolerance for risk the sportsbook may have for a corresponding game. In contrast, the lower the correlation threshold, the lower the tolerance for risk the sportsbook may have for the corresponding game.

Furthermore, and as described in subsequent sections below, there correlation threshold may correspond to a point in which platform 100 may prompt bettor 160 to elect a variable payout model for a parlay in order to place the offer in condition for acceptance by the sportsbook. Such prompt may be enabled or disabled by operator 150.

2. Bettor Based Specification

In some embodiments, platform 100 may enable bettor 160 to define their risk tolerance, control automatic acceptance of bets, and modify their criteria as it relates to, for example, but not limited to, the correlation threshold and/or payout multipliers in a variable payout model. For example, bettor 160 can elect to view "same event parlays," bettor could ask for all combinations the sport, the league, specific team, specific positions, specific start times, specific players, and the like. Bettor 160 can specify they want a certain payout, or they can specify they want higher chances of winning. In which platform 100 may identify and provide the necessary selections (e.g., filtering the selections), such as, for example, all correlated selections or all combinations that pay above a certain threshold. The aforementioned criteria may enable bettor 160, for example, but not limited to only submit bets that bettor 160 considers favorable. In yet further embodiments, platform 100, via interface system 120, may be configured to automatically generate available bet(s) and/or parlay(s) based on predefined criteria on behalf of bettor 160.

In a variable odds sportsbook situation, bettor 160 may request all of the available combinations that have a high potential payout multiplier (this may just mean those parlays have a close-to-zero or zero correlation). Going the next layer down, platform 100 may be enabled to identify the parlays with minimal correlation, yet still possess payouts that are close to the highest payout offered. At the opposite end of the spectrum, the most correlated entries with the smallest payouts may be identified by platform 100 to bettor 160. For example, bettor 160 may wish to pick players on the same team, especially if their home team, even if the odds were small, in order to make more money than a straight bet would pay out.

iv. Compliance Determination Module 114

In some jurisdictions, fantasy and sports betting must follow statutory compliance rules. In some embodiments consistent with the present disclosure, compliance determination module 114 may be provided to make sure the betting within the game hosted by a sportsbook follows the compliance rules. Compliance determination module 114 may require certain parameters before enabling a player to make a bet, such as, but not limited to, the number of players within the bet, the number of teams within the parlay, as well as other legal requirements.

One example of a legal requirement is that each bettor 160 in the game must bet on at least one athlete from more than one team. Another example of a legal regulation is that each bettor 160 in the game must bet on at least two players. Another example of this is for fantasy sports operators in certain states not being able to host contests related to college sports. These rules have been carefully designed to ensure fair play. Various embodiments of platform 100 may process each bet or parlay to ensure that it meets the requirements of the jurisdictions in which either Bettor 160 resides, or where the sportsbook hosting the game resides. If the offer (i.e., a submission of a bet or parlay) is found to be non-compliant, then control system 110 may be configured to, for example, inform decision module 113 for appropriate action. Legal compliance rules may be access by control system 110 through data store system 130's compliance data module 134, which may comprise a plurality of rules for a plurality of jurisdictions.

B. Interface System 120

Interface system 120 may enable users, such as bettors 160 and operators 150, to interface with platform 100 and other systems within or in operative communication with platform 100. In some embodiments consistent with the present disclosure, interface system 120 may enable other computing modules, such as third-party software or computing devices 600, to communicate with the platform 100 in order to, for example, interact with control system 100. In this way, a third-party operator may be enabled to obtain the benefits platform 100 through a communication with control system 100. It should be understood that not all modules of interface system 120 need to be deployed. Rather, some modules may communicate with control system 110 exclusively through an API established between a third-party integration with platform 100, while others may implement a user interface provided by platform 100.

i. System Interface Module 121

In some embodiments consistent with the present disclosure, system interface module 121 may provide an Application Programing Interface (API). The API may interface software and computing devices with platform 100. In some embodiments, an operator interface Module 122, bettor interface module 123, and administrative interface module 124 may interface with control system 110 via system interface module 121. For example, when bettor 160 places a bet via bettor interface module 123, bettor interface module 123 may provide data associated with the bet to control system 110 via system interface module 121. Having system interface module 121 relay data to and from control system 110 enables, among other advantages, a uniform communication protocol, regardless of the medium or component through which a user interface is being provided to an end-user.

The following is a non-limiting example of an operation that may be performed by system interface module 121. At a first stage, bettor 160 may place a bet using bettor interface module 123. Bettor interface module 123 may send the bet parameters to the system interface module 121. System interface module 121 may, in turn, relay the bet parameters to control system 110. Control system 110 may subsequently respond to system interface module 121 with information corresponding to the bet's acceptance or rejection, along with a payout value. System interface module 121 may then relays the information provided by control system 110 to bettor interface module 123, which may then provide the information to bettor 160.

ii. Operator Interface Module 122

In some embodiments consistent with the present disclosure, operator 150 may be presented with a User Interface (UI) via Operator Interface Module 122. Operator interface module 122 may be configured to communicate UI inputs made by operator 150 to control system 110 via system interface module 121. Operator Interface module 122 may provide, for example, but not limited to, the ensuing functionality.

In some embodiments consistent with the present disclosure, operator 150 may define the parameters of a game as stored in a events and rules module 131. In some embodiments, game parameters may include, game type, game rules, game settings, and other game defining parameters. Defining such parameters may enable operators may host any variety of bets for numerous events. Some of those bets maybe be correlated, in which scenario platform 100 may allow operator 150 to host as many bets as they want without the risk of accepting improperly priced correlated player prop parlays.

For example, operator 150 may create a plurality of games that bettors 160 may have an ability to participate in, such as, but not limited to, sporting events and fantasy sports contests. In some embodiments, operator 150 may specify, for example, but not limited to, a sport type(s) for the game, a type of game, such as, but not limited to, baseball and basketball, a list of approved jurisdictions for bettor 160, and a list of acceptable bet types for each game. Accordingly, platform 100 may be configurable with any game type(s) and associated settings and parameters. Platform 100 may then employ its systems and modules to enforce the game rules, settings, and other parameters.

Still consistent with embodiment so the present disclosure, platform 100 may not host the game itself. Rather, platform 100 may be configured to process bets and parlays received from third-party hosted games. Accordingly, platform 100 may be integrated with the game and receive game data, such as, but not limited to, bets, parlays, and parameters associated with bettor 160. Still, operator 150 may be enabled to define any additional game rules, settings and parameters desired to be enforced upon the integrated third-party game by platform 100.

The rules and parameters establish which bets and/or parlays are acceptable to sportsbook. In some embodiments, operator 150 may elect to manually, or with the help of a separate system, to accept or decline every bet and/or parlay based on data or recommendations provided by platform 100.

The rules and parameters may specify how the payout odds are calculated. These may include, but not limited to:

- Minimum rake—where operator 150 may provide the minimum rake that is acceptable.
- Correlation threshold—where operator 150 may provide the level of acceptable risk of any given bet and/or parlay, as defined by correlation module 111. In some embodiments, operator 150 may provide additional validation to be enforced for bets and/or parlays that cross a certain threshold of correlation. Accordingly, operator 150 may be enabled to set their risk tolerance for a game or what level of correlation they're comfortable with. This may be defined as the correlation threshold of an offer received from bettor 160. In turn, platform 100 may not allow any bet(s) and/or parlay(s) that exceed the aforementioned correlation threshold upon a calculation of the correlation values or related contingences associated with each bet(s) and/or parlay(s).
- Type of payout model—where operator 150 may choose a fixed payout model (e.g., 2.5×) or a variable payout model based on multiple metrics such as, but not limited to, for example, risk, correlation, and minimum rake. Accordingly, in some embodiments, operator 150 may set the payout type(s), amount of 'rake', 'margin', and/or related contingencies they want to take on any bet. Accordingly, the platform 100 may not allow bet(s) and/or parlay(s) that exceed and/or fall short of the aforementioned parameters provided by operator 150.

In some embodiments, operator 150 may allow bettor 160 to elect a payout type for each offer. For example, if under a fixed payout model, the correlation threshold is exceeded and bettor 160's offer is declined by control system 110, a game setting may permit Bettor 160 to elect a variable payout model in which the correlation threshold may not be under consideration, thereby permitting an acceptance of the offer. In some embodiments, operator 150 may define a first correlation threshold for a fixed payout mode, and a second correlation threshold for a variable payout model. In this way, the correlation threshold is not disregarded in the payout model.

In various embodiments, operator 150 may decide which rules and parameters may be altered during the course of the game. For example, in some embodiments, in addition to correlation rules, the operator may choose to alter the payout of future wagers and/or parlays for the game based on at least the previous bets and/or parlays made during the course of the game.

In some embodiments consistent with the present disclosure, operator 150 may be provided with a dashboard that displays game info and stats. In some embodiments, operator 150 may choose what info should be displayed on the dashboard. The aforementioned info and stats may include, but not limited to:

Incoming offers/wagers—where every offered, accepted and/or declined wager and/or parlay placed by bettor 160, along with bet size, may be displayed.

Revenue—where information of the accrued revenue may be displayed. In some embodiments, the revenue may be displayed on a per game and/or bettor 160 basis. In some embodiments, a summary of the revenue for all games the Operator provides may be displayed.

Periodic Summary—where operator 150 may be provided with a summary of all activity for a period of time chosen by operator 150. The activity may include, but not limited to, number of participants, most popular games, placed and/or declined wagers and/or parlays, accrued revenue, etc.

iii. Bettor Interface Module 123

In some embodiments consistent with the present disclosure, bettor 160 may be presented with a UI via bettor interface module 123. Bettor interface module 123 may provide the selections made by bettor 160 in the UI to control system 110 via system interface module 121. In some embodiments, the UI available to bettor 160 may not be provided through platform 100. Rather, the UI may be that of a third-party hosted game implementing platform 100 through, for example, an API. In such instance, the level of control over the UI available to the bettor 160 may vary based on the scale of integration and implementation with platform 100. In some embodiments, platform 100 may have no control over the game interface provided to bettor 160. Rather, in such instances, only data provided to platform 100 regarding the offer received from bettor 160 to sportsbook may be provided for correlation analysis. In turn, platform 100 may return a correlation value with no other effects upon the game interface provided to bettor 160. In some instances, platform 100 may return a variable payout offer. Accordingly, as an example of some embodiments, bettor interface module 123 may provide, for example, but not limited to, the ensuing functionality.

In some embodiments, bettor interface module 123 may receive the bets and/or parlays from a bettor and/or a group of bettors. In some embodiments, bettor interface module 123 may present the bettor and/or group of bettors with a choice of payout type. Bettor interface module 123 may then receive the selection made by the bettor and/or group of bettors. In some embodiments, platform 100 may reject the bet and/or parlay made by bettor and prevent the submission of an offer to the sportsbook.

In some embodiments consistent with the present disclosure, bettor interface module 123 may only display the selections made available to the bettor, and those selections made by the bettor(s) as part of their parlay offered to the sportsbook. Consistent with various embodiments herein, the available selections may be, in some instances, prepopulated based on game parameters defined by the operator of the sportsbook, such as, for example, a risk tolerance and/or legal compliance. In some embodiments, bettor interface module 123 may display the odds of the bet(s) and/or parlay(s) made by the bettor(s). In some embodiments, the odds may be calculated for both correlated and non-correlated bets. In some embodiments, the odds may be calculated by the correlation module 111. In some embodiments, an external pricing engine may be used in calculation of the odds. In some embodiments, bettor 160 may need to confirm the calculated odds and/or payout prior to the bet and/or parlay being submitted as an offer to the sportsbook.

Still consistent with various embodiments of the present disclosure, platform 100 may be operative to control the available selections through Bettor interface module 123, while in other embodiments, platform 100 may serve as an open-ended bet/parlay building application. In some instances, where the sportsbook has defined a pre-approved listing of bets that may be aggregated into a parlay offer, correlation module 111 may pre-process each combination of bets to dynamically control the available selections subsequent to each bet as a parlay is aggregated. In this way, as selections are made by bettor 160, the choices available made be limited so as not to allow the parlay to exceed the game's correlation threshold. As mentioned above, some games may permit bettor 160 to alternate payout types to ensure a parlay that is acceptable by the sportsbook.

Further still, in some embodiments, as bets are received and aggregated into a parlay, interface system 120 may communicate such selections to control system 110 which processes a correlation value through correlation module 111 of the parlay under construction. When the correlation threshold is reached by the construction of the parlay, even prior to bettor 160's completion of construction the parlay, a notification may be provided to bettor 160 that the parlay may not be acceptable as it has surpassed the correlation threshold. In some embodiments, Bettor interface module 123 may be configured to prevent the available selections bettor 160 can make if such subsequent selections would surpass the correlation threshold, as calculate by correlation module 111.

iv. Administrative Interface Module 124

In some embodiments consistent with the present disclosure, an administrative interface to control and maintain the platform and its users, such as bettors 160 and operators 150, may be provided. Administrative interface module 124 may integrate such control system 110 via the system interface module 120.

In some embodiments, the administrative interface module 124 may provide user management capabilities. The user management capabilities may include, but not limited to:

Add/Remove users, such as Bettor and Operator users;

Disable users;

Limit user bet size;

Define/Set Risk Tolerance and Correlation Thresholds;

View and edit user information; and

Audit user activity.

In some embodiments consistent with the present disclosure, the Administrative interface module 124 may provide an interface to maintain platform 100 and alter the platform parameters. The aforementioned interface may provide functionality such as, but not limited to:

Audit all system activity, such as, but not limited to:

All placed bet(s) and/or parlay(s) with an optional timestamp;

All rejected bet(s) and/or parlay(s) with an optional timestamp;

The user that made each bet and/or parlay;

The result of each bet and/or parlay after the completion of the associated event;

Enable/Disable each optional module;

Adjust billing information;

Audit all information stored in the Data Store System and perform backups and exports;

Whitelist and/or blacklist IP address, IP address ranges, and DNS entries for access to platform 100;

Connect and disconnect external sources; and

Other administrative tasks.

In some embodiments consistent with the present disclosure, all administrative functions may be provided through the API via the System Interface Module.

C. Data Store System 130

In some embodiments consistent with the present disclosure, data store system 130 may be provided. Data store system 130 may retain any information that is relevant to the platform 100 on a computer readable medium. The computer readable medium may be compatible with a computing device 600. Data store system 130 may comprise, but not limited to, a events and rules data module 131, a parameters data module 132, a user data module 133, and a compliance data module 134. In some embodiments, at least one data module may not be provided, such as compliance data module 134. data store system 130 may be provided by a computing device 600 or a plurality of computing devices 600. The plurality of computing devices 600 may be centralized, such as a data center and/or cloud service, or decentralized, such as a blockchain or a decentralized cloud service. Data store system 130 may receive and provide data from/to the control system 110.

i. Events and Rules Data Module 131 in some embodiments consistent with the present disclosure, a events and rules data module 131 may be provided. Events and rules data module 131 stores correlation data and rules data associated with various games. The correlation data consistent with the present disclosure may comprise, but not limited to, different types of correlation compatible with the platform 600 and all correlation data calculated for every wager and/or parlay processed by the system. For example, different game types may have different correlation rules by which the correlation module 111 may perform its correlation analysis. Accordingly, correlation module 111 may retrieve said rules from events and rules data module 131 which may, in turn, provide the appropriate rules based on, for example, but not limited to, the parameters of the game, bet, or parlays being analyzed by correlation module 111.

ii. Parameters Data Module 132

In some embodiments consistent with the present disclosure, a parameters data module 132 may be provided. Parameters data module 132 may store all parameters associated with at least one game offered by the sportsbook or as defined by operator 150. The parameters may include, but not limited to, player positions, player statistics, player history, player scores, etc. In some embodiments, the parameters may be provided by external sources 140.

iii. User Data Module 133

In some embodiments consistent with the present disclosure, a user data module 133 may be provided. the user data module 133 may store all data associated with every user, such as operators 150 and bettors 160. The aforementioned data may comprise, but not limited to, identification data (name, address, etc.), billing data, authentication data (username, password, two-factor key, etc.), user preferences, dashboard configuration, etc.

iv. Compliance Data Module 134

In some embodiments consistent with the present disclosure, a compliance data module 134 may be provided. Compliance data module 134 may store compliance data relevant to the jurisdiction of the game. In some embodiments, the jurisdiction may be provided based on the location of operator 150 and/or bettor 160 and/or the game being offered. In some embodiments, compliance data module 134 may not be provided, or may contain no data (if the jurisdiction does not have any compliance laws). In some embodiments, the compliance may be the responsibility of operator 150 and/or bettor 160, therefore be only their responsibility to follow.

D. External Sources 140

In order to obtain the most up to date information about an event for which bet(s) and/or parlay(s) are handled, the platform 100 may integrate with a plurality of external sources. In some embodiments consistent with the present disclosure, the external sources may be used to obtain information for real and fantasy events. The external sources may be integrated with the system via the public internet and/or private connections such as dark fiber directly to the source. The external sources may include, but not limited to:

Canadian Football League (CFL)

Women's National Basketball Association (WNBA)

Major League Soccer (MLS)

National Football League (NFL)

National Basketball Association (NBA)

National Hockey League (NHL)

Fédération Internationale de Football Association (FIFA)

World Boxing Association (WBA)

International Tennis Federation (ITF)

International Cricket Council (ICC)

Professional Golfers' Association (PGA)

Formula One (F1)

Fédération Internationale des Échecs (FIDE) or World Chess Association

Jockey Club

Entertainment and Sports Programming Network (ESPN)

United Fighting Championship (UFC)

The Weather Channel

IV. Platform Operation

Embodiments of the present disclosure provide a hardware and software platform operative by a set of methods and computer-readable media comprising instructions configured to operate the aforementioned modules and computing elements in accordance with the methods. The following depicts an example of a method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, computing device 600 may be employed in the performance of some or all of the stages disclosed with regard to the methods. Still consistent with embodiments of the present disclosure, various operating environments may include integration of platform 100 into a distributed environment, such as a licensing of platform 600, or certain systems or modules therein, by, for example, a third-party sportsbook or sportsbook operator. In such environments, the different stages may be performed or provided by different elements, both internal and external to platform 100. The distribution between internal and external elements, in such scenarios, may be facilitated by, for example, an API or similar communication protocol between systems.

Furthermore, although the stages of the following example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 2:
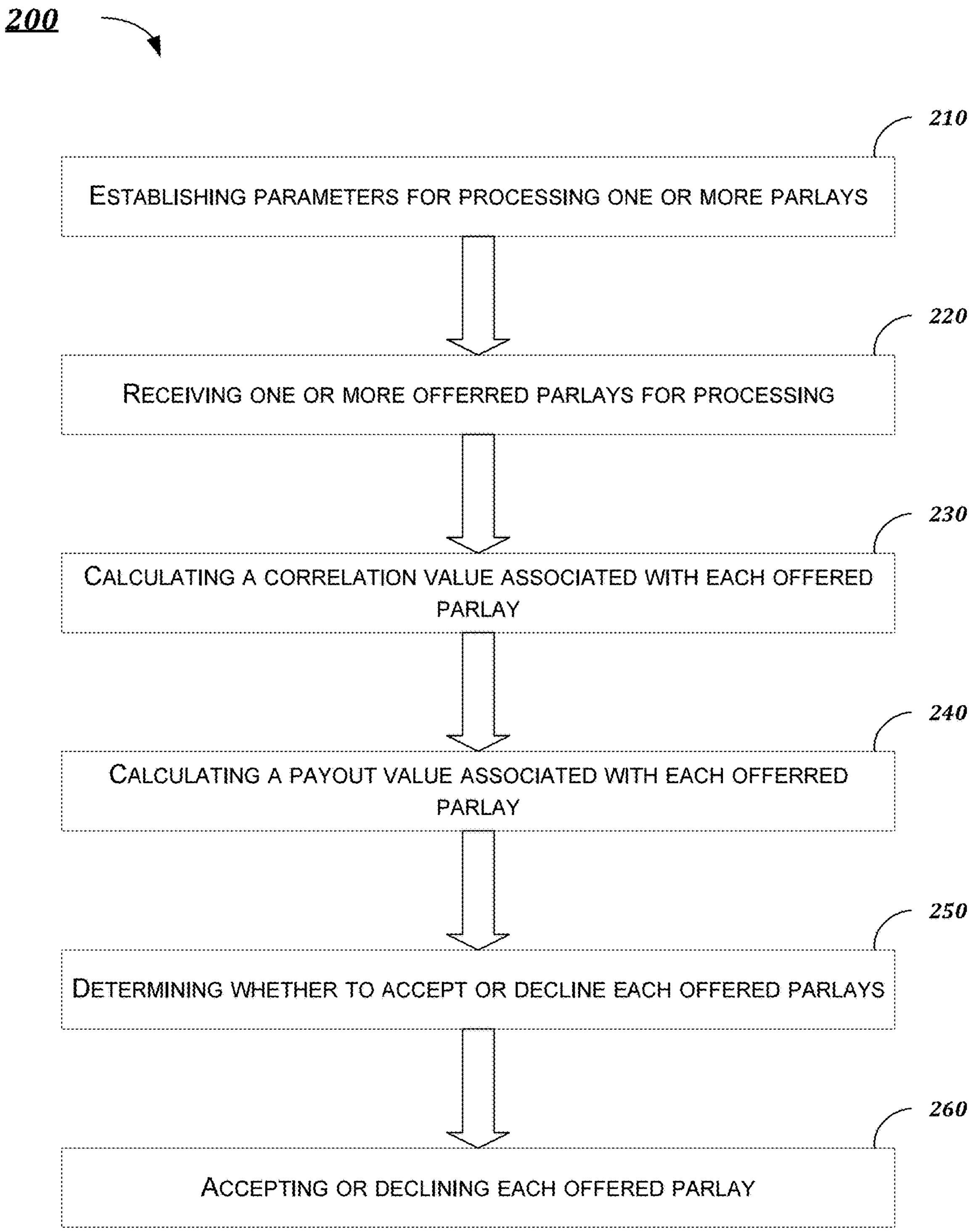
FIG. 2 is a flow chart of a method for providing sportsbook odds optimization and parlay correlation analysis consistent with some embodiments of the present disclosure.

FIG. 2 is a flow chart setting forth the general stages involved in a method 200 consistent with an embodiment of the disclosure for providing platform 100. Method 200 may be implemented using a computing device 600 as described in more detail below with respect to FIG. 6. Method 200 may be implemented using a computing device 600 or any other component associated with platform 100 as described in more detail below with respect to FIG. 6. For illustrative purposes alone, computing device 600 is described as one potential actor in the follow stages.

Method 200 may begin at stage 210 where computing device 600 may establishing parameters for processing one or more parlays. The parameters may specify one or more conditions for accepting or declining parlays. The specification may be provided by operator 150 and/or, in some instances, bettor 160.

From stage 210, where computing device 600 establishes the processing parameters, method 200 may advance to stage 220 where computing device 600 may receive on or more parlay offerings for processing. The processing may be based on the established parameters. Processing may include, for example, but not be limited to, parsing parlay data. The parsing may segment and identify various aspects of the parlay, such as each bet within the parlay (bet-to-parlay relationship), and bettor 160 data associated with the parlay (bettor-to-parlay relationship).

Once computing device 600 parses the parlay offering in stage 220, method 200 may continue to stage 230 where computing device 600 may calculate a correlation value associated with each offered parlay. Calculation may be performed based on the parsed parlay and the various correlation rules that may apply to the parlay parameters. Correlation parameters may include, for example, but not be limited to, internal correlation factors (e.g., parameters bets within the parlay, such as sport-type, any combinations of sport-types, game scripts, as well as related contingencies of the bets within the parlay, and the like), and external correlation factors (e.g., climate, whether, environment, and the like). Determining which factors to employ in the correlation calculation may include, for example, accessing various databases, both internal to platform 100 and external. Furthermore, as described with reference to methods 400 and 500, correlation calculations may be performed throughout the aggregation of a parlay offering.

After computing device 600 calculated correlation value(s) in stage 230, method 200 may proceed to stage 240 where computing device 600 may calculate a payout value associated with each parlay offering. The payout calculation may be based on a model payout type, such as a fixed payout model or variable payout model, and may be defined by the operator 150 and/or bettor 160. In some embodiments, as described with reference to method 300, the payout type may be switched from the moment of a creation of a parlay offering to the moment of submission of the parlay offering. In some embodiments, payout calculation may be provided by an external system or third-party affiliate with platform 100, such as a company that specializes in odds making.

After computing device 600 calculates the payout value in stage 240, method 200 may proceed to stage 250 where computing device 600 may determine whether to accept or decline each parlay offering. The determination may be based on, for example, the established parlay processing parameters in stage 210. The processing parameters may include, for example, but not be limited to, a threshold correlation value to which the calculated parlay threshold is to be compared against. The determination may be presented to operator 150 with, in some instances, a recommended decision to facilitate a decision by operator 150. In various embodiments, the decision may be executed programmatically. In some embodiments, as described with reference to methods 400 and 500, platform 100 may limit any further aggregation of bets into the parlay offering once the parlay's calculated correlation value has exceeded the threshold.

Once computing device 600 determines an action in stage 250, method 200 may then end at stage 250, where an acceptance or rejection of the parlay offering is performed. In some embodiments, as described with reference to method 300, the parameters of parlay processing may be altered subsequent to a rejection of the parlay. For example, the payout type may be switched in order to place the parlay offering in condition for acceptance.

Figure 3:
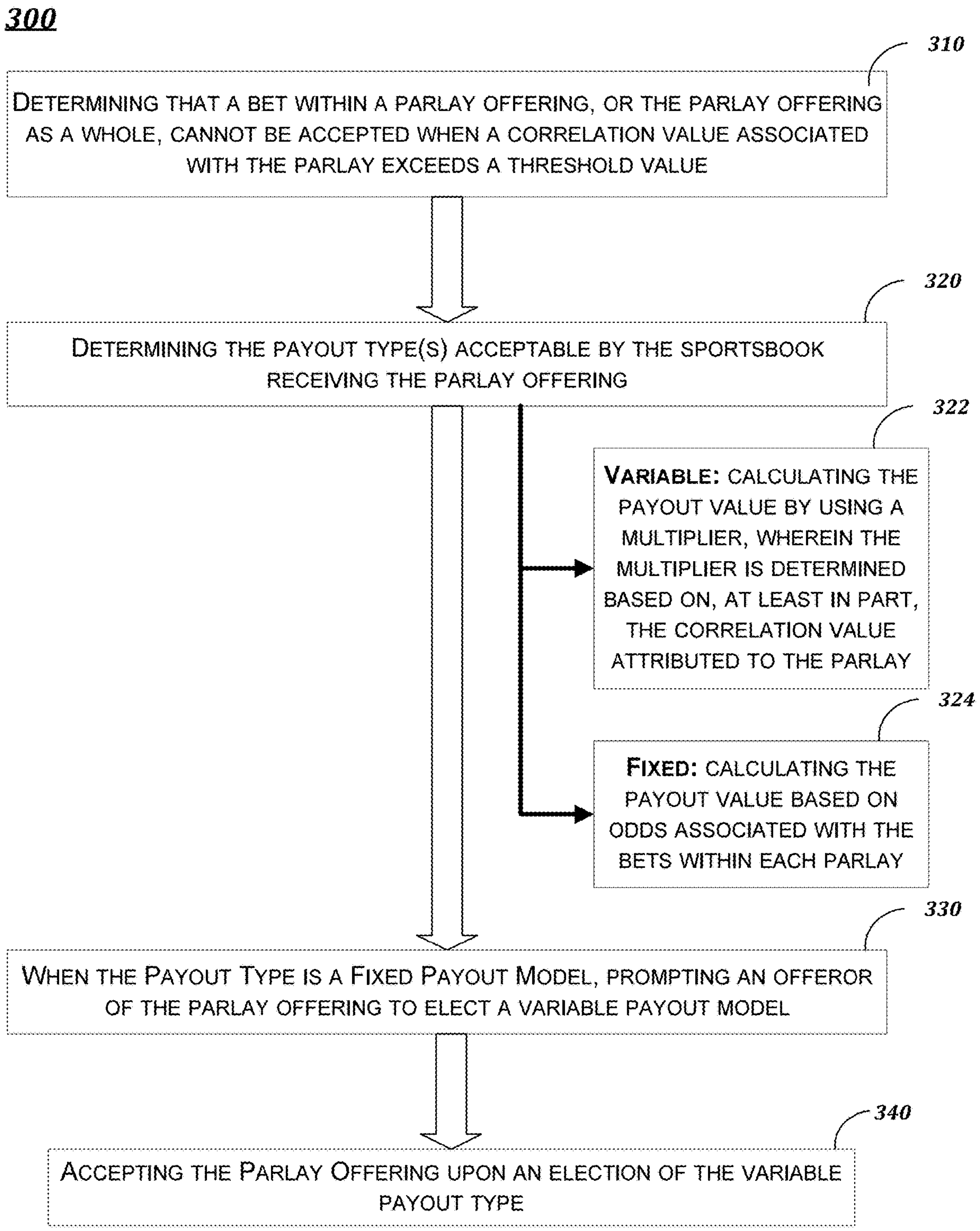
FIG. 3 is a flow chart of a method for providing sportsbook odds optimization and parlay correlation analysis consistent with some embodiments of the present disclosure.

FIG. 3 is a flow chart setting forth the general stages involved in a method 300 consistent with an embodiment of the disclosure for providing platform 100. Method 300 may be implemented using a computing device 600 or any other component associated with platform 100 as described in more detail below with respect to FIG. 6. For illustrative purposes alone, computing device 600 is described as one potential actor in the follow stages.

Method 300 may begin at starting block 305 and proceed to stage 310 where computing device 600 may determine that a bet within a parlay offering, or the parlay offering as a whole, cannot be accepted when a correlation value associated with the parlay exceeds a threshold value.

From stage 310, method 300 may advance to stage 320 where computing device 600 may determine the payout type(s) acceptable by the sportsbook receiving the parlay offering. For example, payout types may include a variable payout model 322 or a fixed payout model 324. Variable payout model 322 may comprise, for example, calculating the payout value by using a multiplier, wherein the multiplier is determined based on, at least in part, the correlation value attributed to the parlay. Fixed payout model 324 may comprise, for example, calculating the payout value based on odds associated with the bets within each parlay.

Method 300 may continue to stage 330 where computing device 600 may prompt, or otherwise provide an indication to, an offeror of the parlay to elect a variable payout model. This may be performed when the payout type is set to fixed payout model 324, and a calculated correlation value exceeds a threshold. Method 300 may proceed to stage 340 where computing device 600 may accepting the parlay offering upon an election of the variable payout model 322. The election may be performed by, but not limited to, bettor 160.

Figure 4:
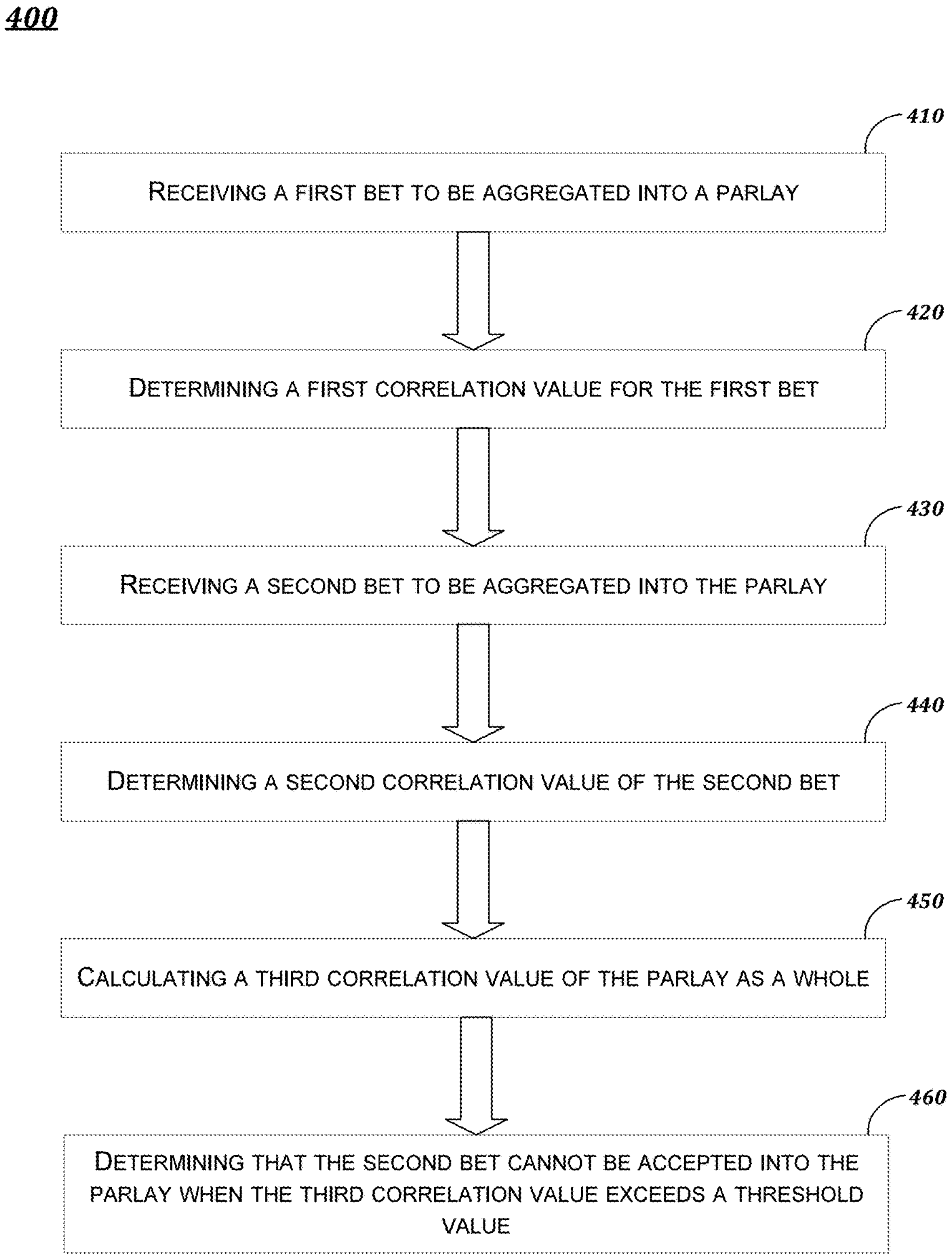
FIG. 4 is a flow chart of a method for providing sportsbook odds optimization and parlay correlation analysis consistent with some embodiments of the present disclosure.

FIG. 4 is a flow chart setting forth the general stages involved in a method 400 consistent with an embodiment of the disclosure for providing platform 100. Method 400 may be implemented using a computing device 600 or any other component associated with platform 100 as described in more detail below with respect to FIG. 6. For illustrative purposes alone, computing device 600 is described as one potential actor in the follow stages.

Method 400 may begin at starting block 405 and proceed to stage 410 where computing device 600 may receive a first bet to be aggregated into a parlay. For example, bettor 160 may be aggregating a parlay offering by inputting custom bet selections one-by-one. In some embodiments, the bet selections may not be limited to any particular bet type, and can be from various sports/events or other mutually exclusive parameters.

From stage 410, method 400 may advance to stage 420 where computing device 600 may determine or calculate a first correlation value for the first bet. In some embodiments, a correlation value for the first bet may already be pre-calculated or otherwise pre-defined by, for example, the sportsbook or operator 150. Once computing device 600 determined the first correlation value in stage 420, method 400 may continue to stage 430 where computing device 600 may receive a second bet. It should be noted that, in various embodiments throughout the present disclosure, the bets may be received from a third-party platform, and not through bettor 160 directly.

After computing device 600 received the second bet in stage 430, method 400 may proceed to stage 440 where computing device 600 may determine or calculate the second correlation value for the second bet. Once computing device 600 has both the first correlation value and the second correlation value, method 400 may then calculate an aggregate correlation value for the parlay offering in stage 450 and determine an acceptance or rejection of the parlay offering in stage 460.

Figure 5:
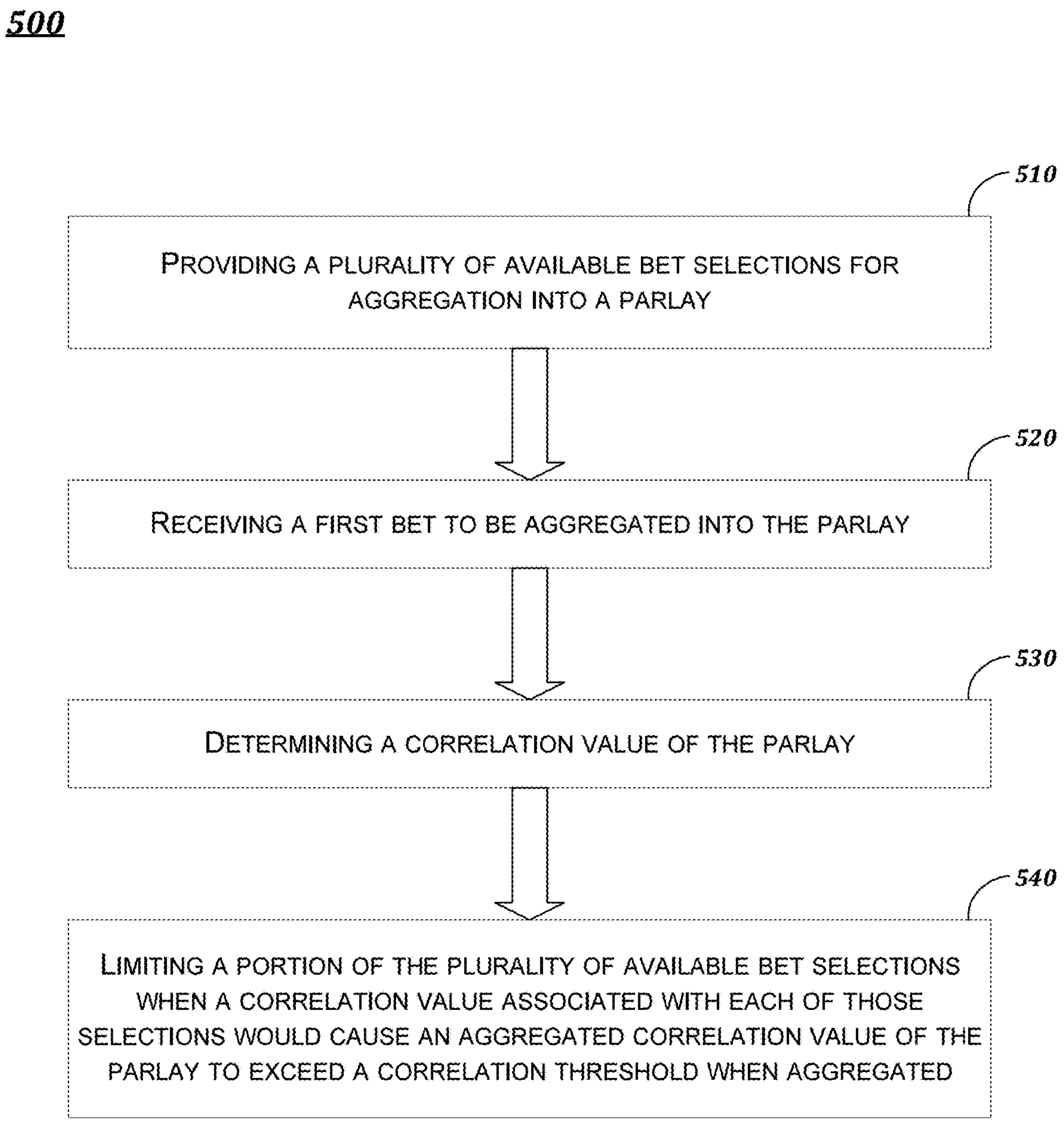
FIG. 5 is a flow chart of a method for providing sportsbook odds optimization and parlay correlation analysis consistent with some embodiments of the present disclosure.

FIG. 5 is a flow chart setting forth the general stages involved in a method 500 consistent with an embodiment of the disclosure for providing platform 100. Method 500 may be implemented using a computing device 600 or any other component associated with platform 100 as described in more detail below with respect to FIG. 6. For illustrative purposes alone, computing device 600 is described as one potential actor in the follow stages.

Method 500 may begin at starting block 505 and proceed to stage 510 where computing device 600 may provide a plurality of available bet selections for aggregation into a parlay. The provision of available selections may be provided to a sportsbook or, in some embodiments, directly to bettor 160. In some embodiments, the available selections may be pre-approved by the sportsbook or operator 150. In some embodiments, the available selections may be generated by one or more parameters (e.g., correlation threshold, game type, and the like) specified by operator 150.

From stage 510, method 500 may advance to stage 520 where computing device 600 may receive a selection of a first bet to be aggregated into a parlay, and subsequently determine or calculate a correlation value of the bet and/or parlay in stage 530.

Method 500 may continue to stage 530 where computing device 600 may then limit or otherwise restrict the available selections for subsequent bet selection. For example, platform 100 may determine that those bets with correlation values that would cause the parlay to have an aggregated correlation value that exceeds a threshold parameter. In some embodiments, limitation of available selections may be done through, but not limited to, for example, a user interface control associated with bettor 160. In this way, bettor 160 may be prevented from submitting or selecting bets that would otherwise cause the aggregated correlation value of the parlay to exceed the threshold parameter. In certain embodiments, selection of certain restricted bets may be permitted, but by way of election of, for example, a variable payout model.

V. Computing Device Architecture

Platform 100, and various systems and modules therein, may be embodied as, for example, but not be limited to, a website, a web application, a desktop application, backend application, and a mobile application compatible with a computing device 600. The computing device 600 may comprise, but not be limited to the following:

- A mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;
- A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although the methods have been described to be performed by a computing device 600, it should be understood that, in some embodiments, different operations may be performed by a plurality of the computing devices 600 in operative communication over one or more networks.

Embodiments of the present disclosure may comprise a system having a central processing unit (CPU) 620, a bus 630, a memory unit 640, a power supply unit (PSU) 650, and one or more Input/Output (I/O) units. The CPU 620 coupled to the memory unit 640 and the plurality of I/O units 660 via the bus 630, all of which are powered by the PSU 650. It should be understood that, in some embodiments, each disclosed unit may actually be a plurality of such units for the purposes of redundancy, high availability, and/or performance. The combination of the presently disclosed units is configured to perform the stages any method disclosed herein.

Figure 6:
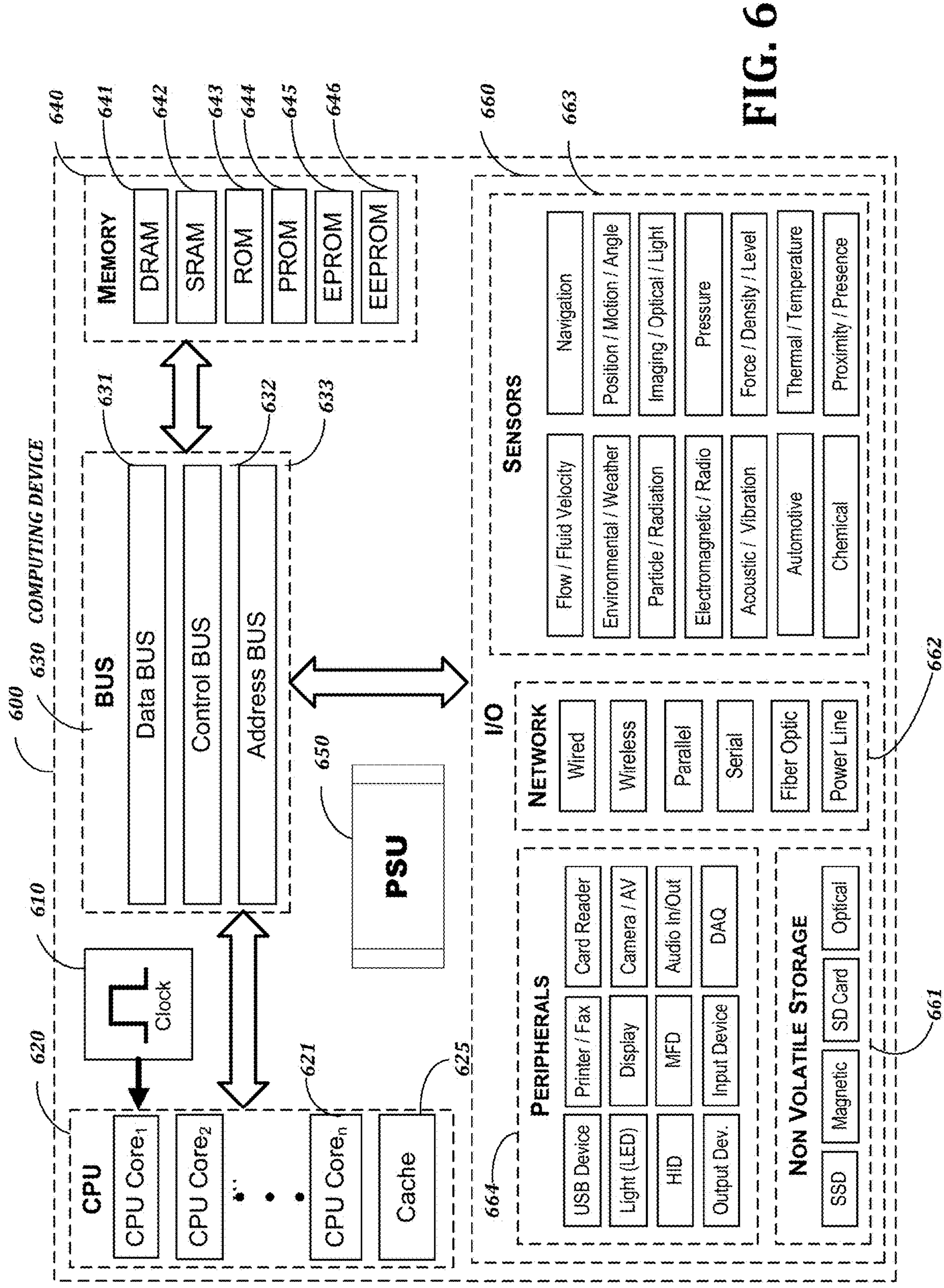
FIG. 6 is a block diagram of a system including a computing device for operation analysis consistent with some embodiments of the present disclosure.

FIG. 6 is a block diagram of a system including computing device 600. Consistent with an embodiment of the disclosure, the aforementioned CPU 620, the bus 630, the memory unit 640, a PSU 650, and the plurality of I/O units 660 may be implemented in a computing device, such as computing device 600 of FIG. 6. Any suitable combination of hardware, software, or firmware may be used to implement the aforementioned units. For example, the CPU 620, the bus 630, and the memory unit 640 may be implemented with computing device 600 or any of other computing devices 600, in combination with computing device 600. The aforementioned system, device, and components are examples and other systems, devices, and components may comprise the aforementioned CPU 620, the bus 630, the memory unit 640, consistent with embodiments of the disclosure.

The One or more computing devices 600 may be embodied as any of the computing elements illustrated in FIG. 1. A computing device 600 does not need to be electronic, nor even have a CPU 620, nor bus 630, nor memory unit 640. The definition of the computing device 600 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 600, especially if the processing is purposeful.

With reference to FIG. 6, a system consistent with an embodiment of the disclosure may include a computing device, such as computing device 600. In a basic configuration, computing device 600 may include at least one clock module 610, at least one CPU 620, at least one bus 630, and at least one memory unit 640, at least one PSU 650, and at least one I/O 660 module, wherein I/O module may be comprised of, but not limited to a non-volatile storage sub-module 661, a communication sub-module 662, a sensors sub-module 663, and a peripherals sub-module 664.

A system consistent with an embodiment of the disclosure the computing device 600 may include the clock module 610 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 620, the central component of modern computers, which relies on a clock. The only exceptions are asynchronous circuits such as asynchronous CPUs. The clock 610 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 600 use a "clock multiplier" which multiplies a lower frequency external clock to the appropriate clock rate of the CPU 620. This allows the CPU 620 to operate at a much higher frequency than the rest of the computer, which affords performance gains in situations where the CPU 620 does not need to wait on an external factor (like memory 640 or input/output 660). Some embodiments of the clock 610 may include dynamic frequency change, where, the time between clock edges can vary widely from one edge to the next and back again.

A system consistent with an embodiment of the disclosure the computing device 600 may include the CPU unit 620 comprising at least one CPU Core 621. A plurality of CPU cores 621 may comprise identical the CPU cores 621, such as, but not limited to, homogeneous multi-core systems. It is also possible for the plurality of CPU cores 621 to comprise different CPU cores 621, such as, but not limited to, heterogeneous multi-core systems, big. LITTLE systems and some AMD accelerated processing units (APU). The CPU unit 620 reads and executes program instructions which may be used across many application domains, for example, but not limited to, general purpose computing, embedded computing, network computing, digital signal processing (DSP), and graphics processing (GPU). The CPU unit 620 may run multiple instructions on separate CPU cores 621 at the same time. The CPU unit 620 may be integrated into at least one of a single integrated circuit die and multiple dies in a single chip package. The single integrated circuit die and multiple dies in a single chip package may contain a plurality of other aspects of the computing device 600, for example, but not limited to, the clock 610, the CPU 620, the bus 630, the memory 640, and I/O 660.

The CPU unit 621 may contain cache 622 such as, but not limited to, a level 1 cache, level 2 cache, level 3 cache or combination thereof. The aforementioned cache 622 may or may not be shared amongst a plurality of CPU cores 621. The cache 622 sharing comprises at least one of message passing and inter-core communication methods may be used for the at least one CPU Core 621 to communicate with the cache 622. The inter-core communication methods may comprise, but not limited to, bus, ring, two-dimensional mesh, and crossbar. The aforementioned CPU unit 620 may employ symmetric multiprocessing (SMP) design.

The plurality of the aforementioned CPU cores 621 may comprise soft microprocessor cores on a single field programmable gate array (FPGA), such as semiconductor intellectual property cores (IP Core). The plurality of CPU cores 621 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 621, for example, but not limited to Instruction-level parallelism (ILP) such as, but not limited to, superscalar pipelining, and Thread-level parallelism (TLP).

Consistent with embodiments of the present disclosure, the aforementioned computing device 600 may employ a communication system that transfers data between components inside the aforementioned computing device 600, and/or the plurality of computing devices 600. The aforementioned communication system will be known to a person having ordinary skill in the art as a bus 630. The bus 630 may embody internal and/or external plurality of hardware and software components, for example, but not limited to a wire, optical fiber, communication protocols, and any physical arrangement that provides the same logical functionality as a parallel electrical bus. The bus 630 may comprise at least one of, but not limited to a parallel bus, wherein the parallel bus carries data words in parallel on multiple wires, and a serial bus, wherein the serial bus carries data in bit-serial form. The bus 630 may embody a plurality of topologies, for example, but not limited to, a multidrop/electrical parallel topology, a daisy chain topology, and connected by switched hubs, such as USB bus. The bus 630 may comprise a plurality of technologies, for example, but not limited to Internal data bus (data bus) 631/Memory bus, Control bus 632, Address bus 633, System Management Bus (SMBus), Front-Side-Bus (FSB), External Bus Interface (EBI), Local bus, Expansion bus, Lightning bus, Controller Area Network (CAN bus), Camera Link, ExpressCard, and Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAc)/External SATA (cSATA), including the powered embodiment eSATAp/Mini-SATA (mSATA), and Next Generation Form Factor (NGFF)/M.2. mall Computer System Interface (SCSI)/Serial Attached SCSI (SAS), HyperTransport, InfiniBand. RapidIO, Mobile Industry Processor Interface (MIPI), Coherent Processor Interface (CAPI), Plug-n-play, 1-Wire, Peripheral Component Interconnect (PCI), including embodiments such as, but not limited to, Accelerated Graphics Port (AGP), Peripheral Component Interconnect extended (PCI-X), Peripheral Component Interconnect Express (PCI-c) (i.g. PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIc (M-PCIe), U.2, and Non-Volatile Memory Express (NVMe)/Non-Volatile Memory Host Controller Interface Specification (NVMHCIS), Industry Standard Architecture (ISA), including embodiments such as, but not limited to Extended ISA (EISA), PC/XT-bus/PC/AT-bus/PC/104 bus (e.g. PC/104-Plus, PCI/104-Express, PCI/104, and PCI-104), and Low Pin Count (LPC), Music Instrument Digital Interface (MIDI), Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and extensible Host Controller Interface (xHCI).

Consistent with embodiments of the present disclosure, the aforementioned computing device 600 may employ hardware integrated circuits that store information for immediate use in the computing device 600, known to the person having ordinary skill in the art as primary storage or memory 640. The memory 640 operates at high speed, distinguishing it from the non-volatile storage sub-module 661, which may be referred to as secondary or tertiary storage, which provides slow-to-access information but offers higher capacities at lower cost. The contents contained in memory 640, may be transferred to secondary storage via techniques such as, but not limited to, virtual memory and swap. The memory 640 may be associated with addressable semiconductor memory, such as integrated circuits consisting of silicon-based transistors, used for example as primary storage but also other purposes in the computing device 600. The memory 640 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 641, Static Random-Access Memory (SRAM) 642, CPU Cache memory 625, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 643, Programmable ROM (PROM) 644, Erasable PROM (EPROM) 645, Electrically Erasable PROM (EEPROM) 646 (e.g. flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with embodiments of the present disclosure, the aforementioned computing device 600 may employ the communication system between an information processing system, such as the computing device 600, and the outside world, for example, but not limited to, human, environment, and another computing device 600. The aforementioned communication system will be known to a person having ordinary skill in the art as I/O 660. The I/O module 660 regulates a plurality of inputs and outputs with regard to the computing device 600, wherein the inputs are a plurality of signals and data received by the computing device 600, and the outputs are the plurality of signals and data sent from the computing device 600. The I/O module 660 interfaces a plurality of hardware, such as, but not limited to, non-volatile storage 661, communication devices 662, sensors 663, and peripherals 664. The plurality of hardware is used by at least one of, but not limited to, human, environment, and another computing device 600 to communicate with the present computing device 600. The I/O module 660 may comprise a plurality of forms, for example, but not limited to channel I/O, port-mapped I/O, asynchronous I/O, and Direct Memory Access (DMA).

Consistent with embodiments of the present disclosure, the aforementioned computing device 600 may employ the non-volatile storage sub-module 661, which may be referred to by a person having ordinary skill in the art as one of secondary storage, external memory, tertiary storage, off-line storage, and auxiliary storage. The non-volatile storage sub-module 661 may not be accessed directly by the CPU 620 without using intermediate area in the memory 640. The non-volatile storage sub-module 661 does not lose data when power is removed and may be two orders of magnitude less costly than storage used in memory module, at the expense of speed and latency. The non-volatile storage sub-module 661 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (661) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO)
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, and Solid State Drive (SSD) and memristor
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD)
- Molecular Memory
- Deoxyribonucleic Acid (DNA) digital data storage Consistent with embodiments of the present disclosure, the aforementioned computing device 600 may employ the communication sub-module 662 as a subset of the I/O 660, which may be referred to by a person having ordinary skill in the art as at least one of, but not limited to, computer network, data network, and network. The network allows computing devices 600 to exchange data using connections, which may be known to a person having ordinary skill in the art as data links, between network nodes. The nodes comprise network computer devices 600 that originate, route, and terminate data. The nodes are identified by network addresses and can include a plurality of hosts consistent with embodiments of the computing device 600. The aforementioned embodiments include, but not limited to personal computers, phones, servers, drones, and networking devices such as, but not limited to, hubs, switches, routers, modems, and firewalls.

Two nodes can be said are networked together, when one computing device 600 is able to exchange information with the other computing device 600, whether or not they have a direct connection with each other. The communication sub-module 662 supports a plurality of applications and services, such as, but not limited to the World Wide Web (WWW), digital video and audio, shared use of application and storage computing devices 600, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g. TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g. Global System for Mobile Communications [GSM], General Packet Radio Service [GPRS], Code-Division Multiple Access [CDMA], and Integrated Digital Enhanced Network [IDEN]).

The communication sub-module 662 may comprise a plurality of size, topology, traffic control mechanism and organizational intent. The communication sub-module 662 may comprise a plurality of embodiments, such as, but not limited to:

Wired communications, such as, but not limited to, coaxial cable, phone lines, twisted pair cables (ethernet), and InfiniBand;

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G;

Parallel communications, such as, but not limited to, LPT ports;

Serial communications, such as, but not limited to, RS-232 and USB;

Fiber Optic communications, such as, but not limited to, Single-mode optical fiber (SMF) and Multi-mode optical fiber (MMF);

Power Line communications.

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with embodiments of the present disclosure, the aforementioned computing device 600 may employ the sensors sub-module 663 as a subset of the I/O 660. The sensors sub-module 663 comprises at least one of the devices, modules, and subsystems whose purpose is to detect events or changes in its environment and send the information to the computing device 600. Sensors are sensitive to the measured property, are not sensitive to any property not measured, but may be encountered in its application, and do not significantly influence the measured property. The sensors sub-module 663 may comprise a plurality of digital devices and analog devices, wherein if an analog device is used, an Analog to Digital (A-to-D) converter must be employed to interface the said device with the computing device 600. The sensors may be subject to a plurality of deviations that limit sensor accuracy. The sensors sub-module 663 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the foregoing are non-limiting examples of the aforementioned sensors.

Consistent with embodiments of the present disclosure, the aforementioned computing device 600 may employ the peripherals sub-module 662 as a subset of the I/O 660. The peripheral sub-module 664 comprises ancillary devices uses to put information into and get information out of the computing device 600. There are 3 categories of devices comprising the peripheral sub-module 664, which exist based on their relationship with the computing device 600, input devices, output devices, and input/output devices. Input devices send at least one of data and instructions to the computing device 600. Input devices can be categorized based on, but not limited to:

Modality of input, such as, but not limited to, mechanical motion, audio, and visual;

Whether the input is discrete, such as but not limited to, pressing a key, or continuous such as, but not limited to the position of a mouse;

The number of degrees of freedom involved, such as, but not limited to, two-dimensional mice vs three-dimensional mice used for Computer-Aided Design (CAD) applications.

Output devices provide output from the computing device 600. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 664:

Input Devices

Human Interface Devices (HID), such as, but not limited to, pointing device (e.g. mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 600. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 600 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data AcQuisition (DAQ) devices covert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, and Refreshable Braille Display/Braille Terminal.

Printers, such as, but not limited to, inkjet printers, laser printers, 3D printers, and plotters.

and Video (AV) devices, such as, but not limited to, speakers, headphones, and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking device (e.g. devices disclosed in network 662 sub-module), data storage device (non-volatile storage 661), facsimile (FAX), and graphics/sound cards.

VI. Aspects

The following disclose various Aspects of the present disclosure. The various Aspects are not to be construed as patent claims unless the language of the Aspect appears as a patent claim. The Aspects describe various non-limiting embodiments of the present disclosure.

A. Aspects Outline

1. Establishing parameters for processing one or more parlays;
   a. Specifying Accept/Decline Conditions:
      i. Operator-Based Specification:
      ii. Bettor-Based Specification:
2. Receiving one or more parlays for processing;
   a. Parsing Parlay Data
      i. Parlay/Bet Relationship:
      ii. Bettor/Parlay Relationship:
3. Calculating a correlation value associated with each parlay;
   a. Rules Based Correlation
      i. Correlation Rule 1:
      ii. Correlation Rule 2:
      iii. Correlation Rule 3:
      iv. Correlation Rule 4:
      v. Correlation Rule 5:
   b. Correlation of Bets within the Parlay
      i. Internal Correlation Factors:
      ii. External Correlation Factors:
   c. Recalculation of the Correlation Value as Bets are Received
   d. Accessing Correlation Rules Data Store System
      i. Determination of Which Correlation Rules to Use
   e. Accessing External Data Sources
      i. External Data Source Selection:
         1. External Data Source Types:
      ii. Identifying the Data Source based on a Correlation Rule Type:
4. Calculating a payout value associated with one or more parlays;
   a. Type-Based Calculation
      i. Variable Payout Model:
      ii. Fixed Payout Model:
   b. Recalculation of the Correlation Value as Bets are Received
      i. Bettor-Based Specification:
5. Determining whether to accept or decline the one or more parlays; and
   a. Verifying Accept/Decline Conditions:
      i. Correlation Threshold Based Verification:
      ii. Payout Type Based Verification:

b. Operator Based Determination
i. Dashboard Display:
ii. Recommendation Display:
c. Limiting Available Bet Selections
i. Pre-Calculating Each Combination
ii. Limiting Choices based on Current Selection
6. Accepting or declining the parlay.
a. Automated Acceptance of Parlay
i. Based on Threshold Correlation Value
ii. Based on Variable Payout Type
iii. Based on Both Threshold Correlation Value and Variable Payout Type
b. Operator Based Acceptance/Rejection
c. Restriction of Additional Bet within the Parlay
i. Additional Bet Acceptance/Rejection Based on Correlation Threshold:
a. Accepting:
b. Declining:
ii. Additional Bet Acceptance/Rejection Based on Payout Type:
a. Operating-Based Setting
b. Bettor-Based Specification
i. Accepting:
ii. Declining:

B. Detailed Operation of Aspects
1. Establishing parameters for processing one or more parlays;
Specifying Accept/Decline Conditions:
wherein establishing the parameters for processing one or more parlays comprises:
receiving a specification of at least one condition for an acceptance or rejection of the one or more parlays, the at least one condition comprising:
a correlation value threshold, and
a payout type:
wherein receiving a specification of at least one condition for the acceptance or rejection of the one or more parlays comprises at least one of the following:
Operator-Based Specification:
receiving, as specified by an operator of a sportsbook to which the parlay was offered, the specification for the correlation value threshold based on at least one operator controlled setting of the game, and
receiving, as specified by an operator of a sportsbook to which the parlay was offered, the specification for the payout type based on at least one operator controlled setting of the game, the payout type corresponding to at least one of the following:
a fixed payout model, and
a variable payout model
Bettor-Based Specification:
receiving, as specified by a bettor offering the one or more parlays to the sportsbook, the specification for a variable payout model as the payout type,
2. Receiving one or more parlays for processing;
Parsing Parlay Data
wherein receiving the one or more parlays comprises at least one of the following:
Parlay/Bet Relationship:
receiving one or more bets within each of the one or more parlays, wherein receiving the one or more bets within each of the one or more parlays comprises:
aggregating the bets into a parlay as they are received from the same bettor;
Bettor/Parlay Relationship:
receiving the one or more parlays attributed to the same bettor,
the bettor being enabled to submit a plurality of parlays as an offer for acceptance by the operator of the sportsbook, and
associating each parlay with the same bettor;
3. Calculating a correlation value associated with each parlay;
Rules Based Correlation
wherein calculating the correlation value associated with each parlay comprises at least one of the following:
Correlation Rule 1:
calculating a scoring environment correlation, the scoring environment correlation being associated with, but not limited to, at least one of the following:
a sport type,
environmental parameters associated with the sport type, the environmental parameters comprising:
precipitation, temperature, and other weather-based parameters,
Correlation Rule 2:
calculating a game script correlation, the game script correlation being associated with, but not limited to, at least one of the following:
a scenario played out within the game,
an occurrence of one or more events within the game,
a circumstance of one or more plays within the game,
Correlation Rule 3:
calculating a blowout correlation, the blowout correlation being associated with, but not limited to, at least one of the following:
a status of the players within the game,
a status of a team within the game,
a score of the game,
Correlation Rule 4:
calculating an overtime correlation, the overtime correlation being associated with, but not limited to, at least one of the following:
a play-time associated with each player,
a duration of the game,
a fatigue of the players within the game,
Correlation Rule 5:
calculating a sport-specific correlation, the sport-specific correlation being associated with, but not limited to, at least one of the following:
a sport type,
game parameters associated with the sport type, the game parameters comprising:
player positions, player statistics, player history, player scores, statistical parameters associated with the sport type, the statistical parameters comprising:
player positions, player statistics, player history, player scores,
Correlation of Bets within the Parlay
wherein calculating the correlation value associated with each parlay comprises:
Internal Correlation Factors:
analyzing each bet within parlay, and
relating the bet to other bets within the parlay External Correlation Factors:

analyzing each bet within parlay, and relating the bet to factors external to the parlay Recalculation of the Correlation Value as Bets are Received wherein calculating the correlation value associated with each parlay further comprises:

updating the calculation upon receiving an additional bet to be aggregated into the parlay;

Accessing Correlation Rules Data Store System wherein calculating the correlation value associated with each parlay further comprises:

accessing a data store having one or more correlation rules for processing, retrieving at least one correlation rule, the at least one correlation rule comprising at least one of the following:

an internal correlation factor, and an external correlation factor,

Determination of Which Correlation Rules to Use wherein retrieving the at least one correlation rule comprises retrieving the at least one correlation rule based on, at least one parameter associated with each bet within the parlay, a quantity of bets within the parlay, a type of sport associated with each bet within the parlay, and Accessing External Data Sources wherein calculating the correlation value associated with each parlay further comprises:

requesting, from an external data source, receiving the requested data from the external data source, and employing the requested data in calculating the correlation value External Data Source Selection:

wherein calculating the correlation value associated with each parlay further comprises:

identifying an external data source for the retrieval of data relevant to the calculating of the correlation value, and establishing a bi-directional communication with the identified data source, External Data Source Types:

wherein establishing a bi-directional communication with the identified external data source comprises establishing the bi-directional communication with at least one of the following:

ESPN,

Weather Channel,

A Sports Statistics Database,

Identifying the Data Source based on a Correlation Rule Type:

wherein identifying an external data source for the retrieval of data relevant to the calculating of the correlation value comprises:

accessing a data store having one or more correlation rules for processing each parlay, retrieving at least one correlation rule relevant to the processing each parlay, and identifying one or more external data sources based on at least one parameter associated with the at least one correlation rule relevant to processing each parlay.

4. Calculating a payout value associated with one or more parlays;

Type-Based Calculation wherein calculating the payout value associated with one or more parlays comprises: determining the specified payout type, and calculating, upon a determination of the specified payout type, for each parlay, the payout value based on the specified payout type;

wherein calculating the payout value based on the specified payout type comprises one of the following:

Variable Payout Model:

calculating, for each parlay, the payout value based on odds associated with the bets within the parlay, and adjusting the payout value associated with the parlay by a multiplier, wherein the multiplier is determined based on, at least in part, the correlation value attributed to the parlay, Fixed Payout Model:

calculating, when the correlation value is within a threshold correlation tolerance value, the payout value based on odds associated with the bets within each parlay, Recalculation of the Correlation Value as Bets are Received wherein calculating the payout value associated with one or more parlays further comprises:

updating the calculation upon receiving an additional bet to be aggregated into the parlay;

Bettor-Based Specification:

wherein calculating the payout value associated with one or more parlays further further comprises:

receiving, as specified by a bettor offering the one or more parlays to the sportsbook, the specification for a variable payout model as the payout type in response to an indication that the correlation value associated with the parlay offered by the bettor exceeds the correlation value threshold specified by the operator of the sportsbook to which the parlay was offered, 5. Determining whether to accept or decline the one or more parlays;

Verifying Accept/Decline Conditions:

wherein determining whether to accept or decline the one or more parlays comprises checking whether the at least one condition for the acceptance or rejection has been met, wherein checking whether the at least one condition for the acceptance or rejection has been met comprises at least one of the following:

Correlation Threshold Based Verification:

verifying that the correlation value associated with the parlay is within the correlation value threshold, and Payout Type Based Verification:

determining that the payout type associated with the parlay is specified to correspond to the variable payout model, Operator Based Determination wherein determining whether to accept or decline the one or more parlays comprises receiving a specification configured to be specified by the operator, the specification comprising at least one of the following:

an indication to accept the one or more parlays, and an indication to reject the one or more parlays;

wherein determining whether to accept or decline the one or more parlays further comprises at least one of the following:

Dashboard Display:

providing an interface configured for an operator, an indication of the one or more parlays offered for acceptance to the sportsbook, wherein providing the interface comprising the one or more parlays offered for acceptance to the sportsbook comprises at least one of the following:

displaying each bet within each parlay, displaying the calculated correlation value associated with each parlay, and displaying the calculated payout value associated with each parlay, Recommendation Display:

providing an indication associated with the at least one condition of acceptance or rejection of each parlay, wherein providing the indication associated with the at least one condition of acceptance or rejection of each parlay comprises providing at least one of the following:

providing a recommendation to accept the one or more parlays based on the at least one condition for acceptance and rejection, and providing a recommendation to reject the one or more parlays based on the at least one condition for acceptance and rejection;

Limiting Available Bet Selections wherein determining whether to accept or decline the one or more parlays comprises limiting additional bets to be accepted within each parlay when a correlation value of the parlay would exceed the threshold correlation value, wherein limiting additional bets to be accepted within each parlay when a correlation value of the parlay would exceed the threshold correlation value comprises at least one of the following:

Pre-Calculating Each Combination pre-approving a plurality of eligible bets configured to be selectable by a bettor for entry into one or more parlays, receiving a selection of a first bet from the plurality of eligible bets proposed to be entered into a parlay, withdrawing approval for a portion of the plurality of eligible bets when the correlation value of the parlay would exceed the threshold correlation value based upon the combined correlation value of the first bet and any one of the withdrawn portions of the plurality of bets, receiving a selection of a second bet from a remaining portion of the plurality of eligible bets, and entering the first bet and the second bet into the parlay without recalculating the combined correlation value of the first bet and the second bet within the parlay.

Limiting Choices based on Current Selection wherein pre-approving the plurality of eligible bets configured to be selectable by a bettor for entry into one or more parlays comprises enabling a selectable display of the plurality of eligible bets, and wherein withdrawing approval for a portion of the plurality of eligible bets comprises disabling the selectable display of the withdrawn portion of the plurality of eligible bets;

6. Accepting or declining the parlay;

Automated Acceptance of Parlay wherein accepting or declining the parlay comprises at least one of the following:

Based on Threshold Correlation Value:

accepting the parlay when the correlation value associated with the parlay is within the correlation value threshold, regardless of the payout type, declining the parlay when the correlation value associated with the parlay is not within the correlation value threshold, regardless of the payout type, accepting the parlay when the correlation value associated with the parlay is within the correlation value threshold and the payout type corresponds to a fixed payout model, declining the parlay when the correlation value associated with the parlay is not within the correlation value threshold and the payout type corresponds to a fixed payout model, Based on Variable Payout Type:

accepting the parlay when the payout type associated with the parlay is specified to correspond to the variable payout model, regardless of the correlation value, Based on Both Threshold Correlation Value and Variable Payout Type:

accepting the parlay when the payout type associated with the parlay is specified to correspond to the variable payout model and when the correlation value within the correlation value threshold and the payout type, and declining the parlay when the payout type associated with the parlay is specified to correspond to the variable payout model when the correlation value associated with the parlay is not within the correlation value threshold and the payout type corresponds to a fixed payout model;

Operator Based Acceptance/Rejection wherein accepting or rejecting the parlay comprises at least one of the following:

accepting, upon receiving the indication to accept as specified by the operator, and rejecting, upon receiving the indication to reject as specified by the operator.

Restriction of Additional Bet within the Parlay wherein accepting or declining the parlay further comprises:

accepting or declining an additional bet requested to be aggregated into the parlay, wherein accepting or declining the additional bet comprises one of the following:

Additional Bet Acceptance/Rejection Based on Correlation Threshold:

recalculating the correlation value of the parlay upon receiving the additional bet to be aggregated into the parlay, determining that the recalculated correlation value of the parlay exceeds the threshold correlation value upon the introduction of the additional bet into the parlay, and Accepting:

accepting the additional bet in response to a determination that the correlation of the parlay having the additional bet aggregated therein does not exceed the threshold correlation value.

Declining:

declining the additional bet in response to a determination that the correlation of the parlay having the additional bet aggregated therein exceeds the threshold correlation value.

Additional Bet Acceptance/Rejection Based on Payout Type:

Operating-Based Setting:

wherein accepting or declining the additional bet comprises:

receiving, as specified by an operator of a sportsbook to which the parlay was offered, the specification for the payout type based on at least one operator controlled setting of the game, the payout type corresponding to the variable payout model, and entering the additional bet into the parlay with the variable payout model as the payout type associated with the parlay, and accepting the parlay comprising the additional bet.

Bettor-Based Specification:

wherein accepting or declining the additional bet comprises:

recalculating the correlation value of the parlay upon receiving the additional bet to be aggregated into the parlay, determining that the recalculated correlation value of the parlay exceeds the threshold correlation value upon the introduction of the additional bet into the parlay, and performing, upon the determination of the recalculated correlation value, one of the following:

Accepting:

providing an indication, the indication configured to be received by the bettor, that the additional bet can only be accepted into the parlay upon a selection of the variable payout type, receiving, as specified by the bettor offering the additional bet, a specification for the variable payout model as the payout type, the additional bet into the parlay with the variable payout model as the payout type associated with the parlay, and accepting the parlay comprising the additional bet.

Declining:

indicating, with an indication configured to be received by the bettor, that the additional bet can only be accepted into the parlay upon a selection of the variable payout type, receiving, as specified by the bettor offering the additional bet, a rejection of the variable payout model as the payout type, and declining to enter the additional bet into the parlay.

VII. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawings disclose any additional subject matter that is not within the scope of the claims below, the disclosures are not dedicated to the public and the right to file one or more applications to claims such additional disclosures is reserved.

The following is claimed:

1. A system, comprising:

one or more processors; and memory coupled with the one or more processors, the memory storing executable instructions that when executed by the one or more processors cause the one or more processors to effectuate operations comprising:

determining a plurality of parameters for accepting a parlay comprising a plurality of entries;

determining, based on the plurality of parameters, a correlation rule;

determining, based the correlation rule, a correlation value;

determining, based on the correlation value, at least one payout type acceptable for the parlay;

receiving a selection of a variable payout model of the at least one payout type; and accepting the parlay based on the selection of the variable payout model.

2. The system of claim 1, wherein the correlation rule comprises a scoring environment correlation, the plurality of parameters comprise a sport type, and the determination of the correlation value is based on the sport type.

3. The system of claim 2, wherein the plurality of parameters further comprise one or more environmental parameters associated with the sport type, and the determination of the the correlation value is further based on the one or more environmental parameters.

4. The system of claim 3, wherein the one or more environmental parameters comprise a parameter associated with one or more of a precipitation, a temperature, or a weather condition.

5. The system of claim 1, wherein the correlation rule comprises a game script correlation, at least one parameter of the plurality of parameters is associated with a game, and the determination of the correlation value is based on the at least one parameter of the plurality of parameters.

6. The system of claim 5, wherein the at least one parameter of the plurality of parameters is associated with one or more of a scenario associated with the game, an occurrence of one or more events within the game, or a circumstance of one or more plays within the game.

7. The system of claim 1, wherein the correlation rule comprises a blowout correlation, at least one parameter of the plurality of parameters is associated with one or more of a player within a game, a team within the game, or a score of the game, and the determination of the correlation value is based on the at least one parameter of the plurality of parameters.

8. The system of claim 1, wherein the correlation rule comprises an overtime correlation, at least one parameter of the plurality of parameters is associated with one or more of a play-time associated with a player within a game, a duration of the game, or a fatigue associated with the player within the game, and the determination of the correlation value is based on the at least one parameter of the plurality of parameters.

9. The system of claim 1, wherein the correlation rule comprises a sport-specific correlation, the plurality of parameters comprise a sport type, and the determination of the correlation value is based on the sport type.

10. The system of claim 9, wherein the plurality of parameters further comprise one or more game parameters associated with the sport type, and the determination of the correlation value is further based on the one or more game parameters.

11. The system of claim 10, wherein the one or more game parameters comprise one or more of a player position, a player statistic, a player history, or a player score.

12. A method performed by one or more computing devices, the method comprising:

determining a plurality of parameters for accepting a parlay comprising a plurality of entries;

determining, based on the plurality of parameters, a correlation rule;

determining, based the correlation rule, a correlation value;

determining, based on the correlation value, at least one payout type acceptable for the parlay;

receiving a selection of a variable payout model of the at least one payout type; and accepting the parlay based on the selection of the variable payout model.

13. The method of claim 12, wherein the correlation rule comprises a scoring environment correlation, the plurality of parameters comprise a sport type, and the determination of the correlation value is based on the sport type.

14. The method of claim 13, wherein the plurality of parameters further comprise one or more environmental parameters associated with the sport type, and the determination of the the correlation value is further based on the one or more environmental parameters.

15. The method of claim 12, wherein the correlation rule comprises a game script correlation, at least one parameter of the plurality of parameters is associated with a game, and the determination of the correlation value is based on the at least one parameter of the plurality of parameters.

16. The method of claim 15, wherein the at least one parameter of the plurality of parameters is associated with one or more of a scenario associated with the game, an occurrence of one or more events within the game, or a circumstance of one or more plays within the game.

17. The method of claim 12, wherein the correlation rule comprises a blowout correlation, at least one parameter of the plurality of parameters is associated with one or more of a player within a game, a team within the game, or a score of the game, and the determination of the correlation value is based on the at least one parameter of the plurality of parameters.

18. The method of claim 12, wherein the correlation rule comprises an overtime correlation, at least one parameter of the plurality of parameters is associated with one or more of a play-time associated with a player within a game, a duration of the game, or a fatigue associated with the player within the game, and the determination of the correlation value is based on the at least one parameter of the plurality of parameters.

19. The method of claim 12, wherein the correlation rule comprises a sport-specific correlation, the plurality of parameters comprise a sport type and one or more game parameters associated with the sport type, and the determination of the correlation value is based on the sport type and the one or more game parameters.

20. One or more computing devices, comprising one or more processors, configured to:

determine a plurality of parameters for accepting a parlay comprising a plurality of entries;

determine, based on the plurality of parameters, a correlation rule;

determine, based the correlation rule, a correlation value;

determine, based on the correlation value, at least one payout type acceptable for the parlay;

receive a selection of a variable payout model of the at least one payout type; and accept the parlay based on the selection of the variable payout model.

* * * * *